(12) United States Patent
Rebollo López et al.

(10) Patent No.: US 12,346,140 B2
(45) Date of Patent: Jul. 1, 2025

(54) WIND TURBINE TRANSFORMER CONTROL

(71) Applicant: Siemens Gamesa Renewable Energy Innovation & Technology S.L., Sarriguren (ES)

(72) Inventors: Emilio David Rebollo López, Madrid (ES); Manex Barrenetxea Iñarra, Arrasate (ES); Jose María Canales Segade, Durango (ES); Miguel Linares Fano, Pamplona-Navarra (ES); Fernando Santodomingo Llamas, Las Palmas de Gran Canaria (ES)

(73) Assignee: Siemens Gamesa Renewable Energy Innovation & Technology S.L., Sarriguren (ES)

( * ) Notice: Subject to any disclaimer, the term of this patent is extended or adjusted under 35 U.S.C. 154(b) by 231 days.

(21) Appl. No.: 17/613,193

(22) PCT Filed: May 12, 2020

(86) PCT No.: PCT/EP2020/063143
§ 371 (c)(1),
(2) Date: Nov. 22, 2021

(87) PCT Pub. No.: WO2020/239425
PCT Pub. Date: Dec. 3, 2020

(65) Prior Publication Data
US 2022/0308605 A1    Sep. 29, 2022

(30) Foreign Application Priority Data
May 24, 2019    (EP) .................................... 19380009

(51) Int. Cl.
*G05F 1/14*        (2006.01)
*H02J 3/18*        (2006.01)

(52) U.S. Cl.
CPC .............. *G05F 1/14* (2013.01); *H02J 3/1878* (2013.01); *H02J 2300/28* (2020.01)

(58) Field of Classification Search
CPC ........ H02J 3/1878; H02J 3/12; H02J 2300/28; G05F 1/14
See application file for complete search history.

(56) References Cited

U.S. PATENT DOCUMENTS

| 4,623,834 A | 11/1986 | Klingbiel et al. |
| 5,786,684 A * | 7/1998 | Bapat ........................ G05F 1/16 323/343 |

(Continued)

FOREIGN PATENT DOCUMENTS

| AU | 2014 252 950 B2 | 3/2018 |
| CN | 102736028 B | 9/2014 |

(Continued)

OTHER PUBLICATIONS

Dionisio Ramirez et al: "Improvements in the grid connection of renewable generators with full power converters", Renewable Energy., vol. 43, Jul. 1, 2012 (Jul. 1, 2012), pp. 90-100, XP055717798, GB ISSN: 0960-1481, DOI: 10.1016/j.renene.2011.11.054 abstract; figures 2,3.

(Continued)

*Primary Examiner* — Gustavo A Rosario-Benitez
(74) *Attorney, Agent, or Firm* — Schmeiser, Olsen & Watts, LLP

(57) ABSTRACT

A method of controlling a wind turbine transformer is provided. The transformer has a primary side with a primary winding coupled to a power grid and a secondary side with a secondary winding coupled to an electrical power generating system of the wind turbine. The wind turbine transformer further includes an electronic on-load tap changer having semiconductor switches that are controllable to change a turns ratio of the primary winding to the secondary (Continued)

winding of the wind turbine transformer. The method includes the step of monitoring a voltage on the primary side of the wind turbine transformer, a voltage on the secondary side of the wind turbine transformer, or both. In response to detecting a change in the monitored voltage, the semiconductor switches of the electronic on-load tap changer are automatically controlled to adjust the turns ratio of the wind turbine transformer to compensate for the change.

17 Claims, 10 Drawing Sheets

(56) References Cited

U.S. PATENT DOCUMENTS

| | | | | |
|---|---|---|---|---|
| 5,969,511 | A * | 10/1999 | Asselman | H02P 13/06 323/343 |
| 6,313,614 | B1 * | 11/2001 | Persson | G05F 1/14 323/257 |
| 10,910,842 | B2 * | 2/2021 | Rates Palau | H02J 3/381 |
| 2007/0057651 | A1 * | 3/2007 | Hoffman | G05F 1/147 323/258 |
| 2009/0230933 | A1 * | 9/2009 | Oates | G05F 1/14 323/258 |
| 2010/0264666 | A1 * | 10/2010 | Bo | H02J 3/1878 290/55 |
| 2011/0304141 | A1 * | 12/2011 | Van Dyck | H02J 3/50 290/44 |
| 2012/0306471 | A1 * | 12/2012 | Green | H01H 9/0016 323/355 |
| 2015/0179362 | A1 * | 6/2015 | Hammer | H01F 29/04 200/11 TC |
| 2016/0146191 | A1 * | 5/2016 | Berroteran Gil | H02P 13/06 290/44 |
| 2016/0308368 | A1 * | 10/2016 | Letas | H02J 3/44 |
| 2017/0250542 | A1 * | 8/2017 | Panosyan | H02J 4/00 |
| 2020/0011297 | A1 * | 1/2020 | Hillebrandt | H02P 9/006 |

FOREIGN PATENT DOCUMENTS

| | | | |
|---|---|---|---|
| EP | 2 242 159 A2 | 10/2010 | |
| EP | 3 382 869 A1 | 10/2018 | |
| ES | 2 189 687 A1 | 7/2003 | |
| WO | 2012/000515 A2 | 1/2012 | |
| WO | WO-2017102174 A1 * | 6/2017 | H01F 29/04 |

OTHER PUBLICATIONS

International Search Report & Written Opinion for PCT/EP2020/063143 issued Sep. 4, 2020.

Jawad Faiz et al: "New Solid-State OnloadTap-Changers Topology for Distribution Transformers", IEEE Transactions on Power Delivery, IEEE Service Center, New York, NY, US, vol. 18, No. 1, Jan. 1, 2003 (Jan. 1, 2003), XP011078911, ISSN: 0885-8977 abstract; figures 2-5.

European Search Report for Application No. 19380009.1, dated Nov. 27, 2019.

* cited by examiner

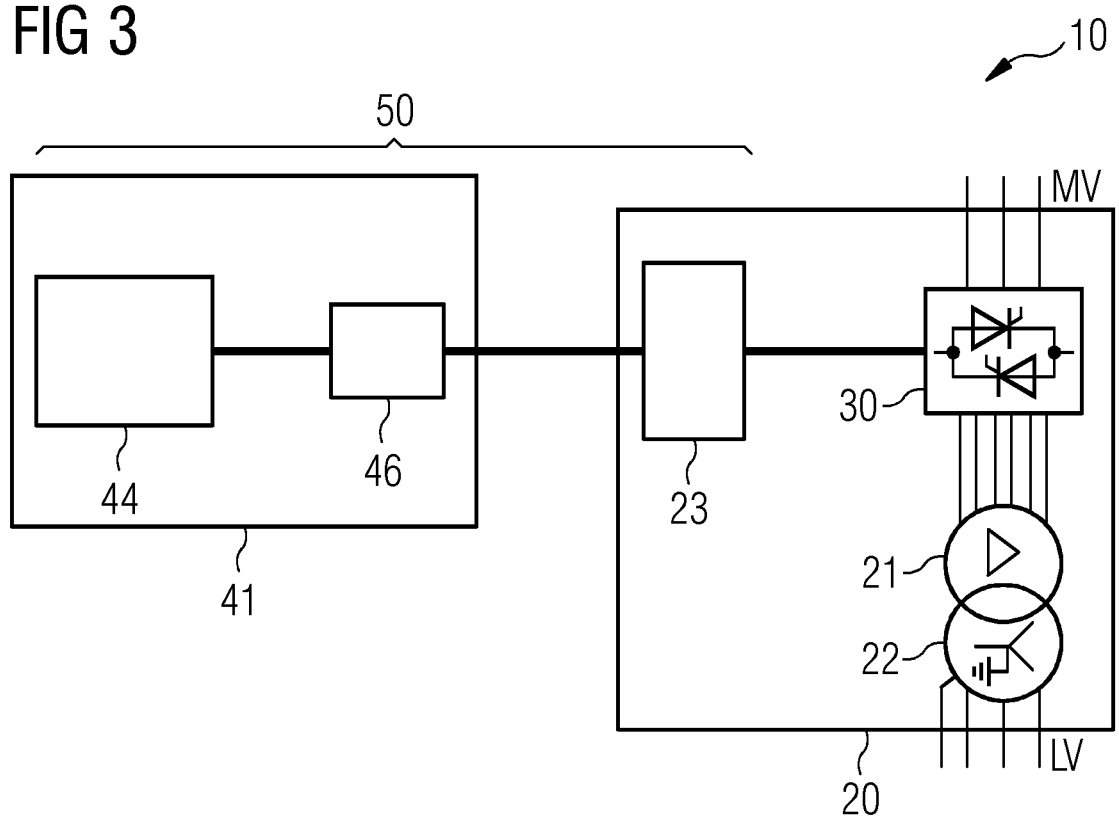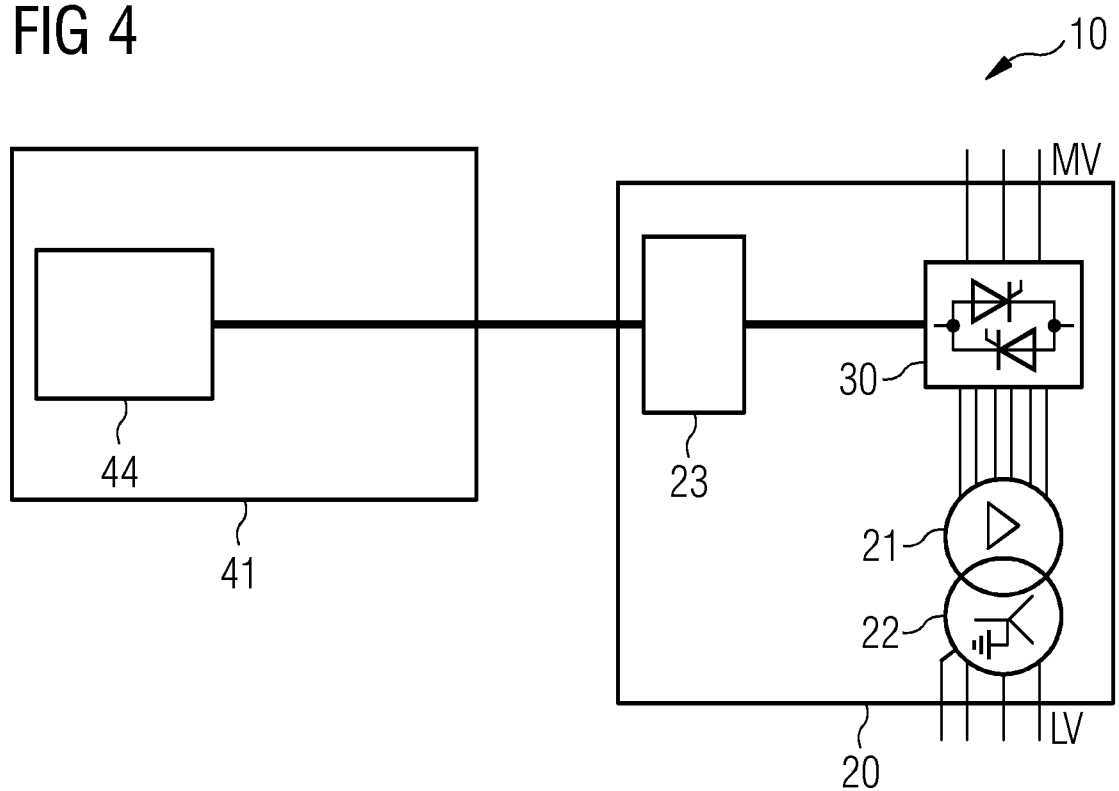

WIND TURBINE TRANSFORMER CONTROL

CROSS-REFERENCE TO RELATED APPLICATIONS

This application claims priority to PCT Application No. PCT/EP2020/063143, having a filing date of May 12, 2020, which claims priority to EP Application No. 19380009.1, having a filing date of May 24, 2019, the entire contents both of which are hereby incorporated by reference.

FIELD OF TECHNOLOGY

The following relates to a method of controlling a wind turbine transformer having a primary side with a primary winding coupled to a power grid and a secondary side with a secondary winding coupled to an electrical power generating system of the wind turbine. The following also relates to a wind turbine transformer and to a wind turbine electrical system.

BACKGROUND

Wind turbines, also termed wind turbine generators (WTGs), comprise a rotor with blades which convert wind energy into rotational mechanical energy and a generator which converts the mechanical energy into electrical energy. Variable speed wind turbines are often equipped with a converter that adjusts the properties of the produced electric power (for example the AC frequency) such that the requirements of the power grid are met. The rotor is thereby allowed to rotate at a desired rotational speed, so that the production of electrical energy can be optimized. The wind turbine is connected to a medium voltage (MV) or high voltage (HV) power grid via a wind turbine transformer that provides transformation of the generated low or medium voltage (LV/MV) electrical power.

When connected to a power grid, wind turbines need to meet the requirements of the grid code, which classifies for example the required behavior during system disturbances. The connected wind turbines have to fulfill certain requirements regarding the capability to supply reactive power, voltage regulation, and ride through, in particular high voltage ride through (HVRT) and low voltage ride through (LVRT). A respective envelope defines the amount of time the wind turbine must tolerate an over-voltage or under-voltage present on the grid before disconnecting. These requirements are becoming increasingly strict and are thus difficult to meet.

To address this problem, it is known to adapt and oversize the wind turbine electrical system to handle such voltage variations. Furthermore, the wind turbine electric capabilities may be de-rated. Such measures are expensive and do not allow the operator to fully exploit the power generating capabilities of the wind turbine. The voltage range in which the wind turbine electrical system can operate is furthermore limited. To meet the grid code requirements, flexible AC transmission systems (FACTS), in particular reactive power compensation equipment (RPCE), which can include capacitor banks, static synchronous compensators (STATCOMs) and the like may additionally have to be installed which results in high costs. Furthermore, due to the voltage range restrictions on the wind turbine side, it is not possible for the wind turbine to provide all the reactive power to the grid which it could possibly supply.

Further, grid voltage variations are transferred to the mechanical structure of the wind turbine as vibrations. Such vibrations result in mechanical fatigue of wind turbine components. Conventionally, this problem is being dealt with by making use of the wind turbine's pitch control, yet such control interferes with the pitch control schemes that try to maximize the electrical power output of the wind turbine.

The existing solutions for meeting the grid code requirements are therefore unfavorable. It is desirable to meet or even exceed these requirements without the need to install expensive additional components. It is further desirable to make full use of the active and reactive electrical power generating capabilities of wind turbines. Further, it is desirable to avoid mechanical stress experienced by the wind turbine due to grid voltage variations.

The document EP 2 242 159 A2 discloses a transformer that is coupled between a wind turbine and a power grid. Each of three power lines of the grid corresponding to different phases is coupled to a primary winding of the transformer. The primary winding includes a tap changer to compensate voltage imbalances occurring on the grid.

The document Jawad et al., "New Solid-State Onload Tap-Changers . . . " IEEE Transactions on Power Delivery, vol. 18, no. 1, 1. January 2003, describes the application of power electronic switches in the tap-changer of distribution transformers. The disclosure is unrelated to wind turbine transformers.

The document U.S. Pat. No. 4,623,834 A describes a switching line regulator that stabilizes the voltage level for consumers. The regulator includes a dual programmable control time constant circuit that includes a stepping counter for switching taps of a tap changer on a secondary side of a transformer of the regulator.

SUMMARY

An aspect relates to a robust and cost-efficient solution that allows a continued operation of the wind turbine upon the occurrence of voltage variations on the power grid, that allows the operator to make better use of the reactive power generating capabilities of the wind turbine, and that reduces mechanical stress on the wind turbine.

According to an embodiment of the present invention, a method of controlling a wind turbine transformer having a primary side with a primary winding coupled to a power grid and a secondary side with a secondary winding coupled to an electrical power generating system of the wind turbine is provided. The wind turbine transformer comprises an electronic on-load tap changer having semiconductors switches that are controllable to change a turns ratio of the primary winding to the secondary winding of the wind turbine transformer. The method comprises the monitoring of a voltage on a primary side of the transformer, a voltage on the secondary side of the transformer, or both. In response to detecting a change in the monitored voltage, the semiconductors switches of the electronic on-load tap changer are automatically controlled so as to adjust the turns ratio of the wind turbine transformer to compensate for the change.

By such method, it becomes possible to react quickly to voltage changes on the power grid and to prevent such voltage changes from significantly affecting the voltage on the secondary side of the transformer. It can thus be achieved that the electrical power generating system can operate at an almost constant voltage, even if low voltage or high voltage conditions or other grid faults are present, which cause voltage dips and swells at the transformer's primary side. Consequently, the electrical power generating system of the wind turbine and the auxiliary systems, i.e., components on the secondary side of the transformer, are only faced with minor voltage variations, so that these components do not need to be oversized and overrated. This results in cost savings and a more efficient use of these components. Reducing these voltage variations further reduces the mechanical stress on the wind turbine components that is experienced in conventional systems due to voltage variations on the power grid. Furthermore, the method allows the compensation of voltage changes on the secondary side of the transformer, which may for example occur when changing the operating point of the electrical power generating system, in particular of a generator/converter of the wind turbine. This allows maximizing the use of the electrical capabilities of the wind turbine, in particular with respect to reactive power generation, operation point, deviations in rotational speed and the like.

As the semiconductors switches allow a fast on-load switching between the transformer taps, a fast reaction to high or low voltage conditions on the power grid becomes possible, which allows the wind turbine to stay connected to the power grid. HVRT and LVRT requirements can thus be exceeded so that grid code compliance can be ensured. As such fast tap changing can be performed for each phase of the transformer, it further allows the operation of the wind turbine on an unbalanced or weak grid.

A control system may be coupled to the electronic on-load tap changer to control the turns ratio, wherein the control system may comprise a converter controller of a converter of the electrical power generating system. For example, the converter controller may control the electronic on-load tap changer. As the converter controller generally comprises fast electronics and voltage monitoring circuits (which may for example sample the primary and/or secondary voltage at high sampling rate), controlling the tap changer by the converter controller not only results in very fast reaction time of the tap changing process, but also in an efficient implementation with reduced complexity.

Due to the reduced voltage variations on the secondary side, the failure rates of LV/MV electric components can further be reduced. As the method allows operation at different voltage ranges on the secondary side of the transformer (in particular within predetermined upper and lower voltage limits or thresholds), the wind turbine can be operated in a voltage range in which a maximum efficiency of the power generation is achieved. Losses may thus be reduced and the electrical energy that is harvested may be maximized. The thermal stress on the electrical system is also reduced, which reduces cooling requirements. Further, the mechanical loads on the power generating system can be minimized in case of grid disturbances.

Furthermore, it is not necessary to implement additional FACTS in order to compensate for variations of the grid voltage or account for reactive power requirements of the grid.

Compensating for the change in the monitored voltage may in particular include adjusting the turns ratio of the transformer so as to keep the voltage on the secondary side of the transformer within a predetermined voltage range, which can for example be defined for a respective operating point of the wind turbine. The turns ratio may in particular be adjusted so as to prevent the voltage on the secondary side to reach a value that causes the triggering of a safety mechanism that disconnects the wind turbine from the power grid. The wind turbine transformer (in the following abbreviated as transformer) is in particular an AC transformer that converts AC electrical power in accordance with the turns ratio. The primary side of the transformer may also be termed grid side or MV/HV side. The secondary side of the transformer may also be termed generator side or LV/MV side.

Adjusting the turns ratio of the transformer may in particular occur by determining a desired transformation ratio required to account for the change; determining a tap position of the on-load tap changer that results in a turns ratio of the transformer that is closest to the desired transformation ratio; and switching the tap changer to the determined tap position by switching the semiconductor switches.

In an embodiment, at least the voltage on the primary side of the wind turbine transformer is monitored. Upon detecting a voltage increase (e.g., spike) in the monitored voltage, the semiconductor switches of the electronic on-load tap changer are controlled to increase the turns ratio so as to maintain the voltage on the secondary side below a predefined upper voltage limit. Upon detecting a voltage drop in the monitored voltage, the semiconductor switches of the electronic on-load tap changer may be controlled to decrease the turns ratio so as to maintain the voltage on the secondary side above a predefined lower voltage limit. The predefined voltage limits may in particular define a voltage range in which the wind turbine can operate without tripping, i.e., without triggering a safety mechanism that disconnects the wind turbine from the power grid, such as a circuit breaker. HVRT and LVRT can thus be achieved for even significant power grid voltage variations. The wind turbine is furthermore prevented from suffering the consequents of grid faults, which can lead to drive train stress, rotor mechanical loads, and excess currents, as the voltage on the secondary side of the transformer can be kept within safe operating limits. The voltage on the primary side of the wind turbine transformer may be monitored by taking measurements at the primary side of the transformer, for example on a terminal connected to the primary winding or close to the connection point of the transformer to the power grid. It should be clear that the voltage on the secondary side of the transformer can be derived from the monitored primary voltage. Also, in a corresponding way, upper and lower voltage limits may be specified for the voltage on the primary side of the transformer.

Additionally, or alternatively, the voltage on the secondary side of the transformer may be monitored, wherein monitoring the voltage on the secondary side of the transformer comprises measuring a voltage on the secondary side of the transformer or obtaining the voltage from a target voltage for the secondary side of the transformer (which may be set by the converter and may thus change during operation, i.e., a voltage setpoint determined by the converter). A target voltage can be a desired optimal voltage at which the electric capabilities are maximized, for example at which an optimal operation point of the generator and converter can be achieved. Upon determining a voltage change in the monitored voltage on the secondary side, the semiconductor switches of the electronic on-load tap changer are controlled to adjust the turns ratio so as to compensate the change. The turns ratio is in particular adjusted so that for the given primary (grid) voltage, the wind turbine can operate at the desired target voltage on the secondary side (in particular within a respective voltage range around the target voltage, or a voltage range around a nominal operating voltage). The turns ratio (i.e., the tap) may for example be changed if the measured voltage on the secondary side of the transformer reaches a respective upper or lower voltage limit, as already indicated above. A change of the voltage on the secondary side can be the result of a change of the grid voltage, and the turns ratio is adjusted to maintain the voltage on the secondary side at or close to the target voltage, in particular within predetermined operating limits (e.g., using feedback control which changes the tap when the voltage on the secondary side reaches an upper or lower limit). The change may also be the result of a change of the operating point of the power generating system.

An operating point can thereby be selected that allows the maximization of the generated electrical power. The rotor may for example be operated at a rotational speed that maximizes the tip speed ratio to optimize the efficiency of the wind turbine. Such optimization of the efficiency is not possible in wind turbines in which the voltage on the secondary side is determined by the grid voltage and a fixed transformation ratio. In particular, if operation with a lower voltage on the secondary side is desired, the turns ratio can be increased, and if a higher voltage on the secondary side is desired, the turns ratio can be reduced.

This will also allow the wind turbine to change the converter operating point by delivering more reactive power while at the same time retaining the voltage on the secondary side within safe operating limits.

Controlling the semiconductor switches of the electronic on-load tap changer to adjust the turns ratio of the wind turbine transformer may comprise determining a new tap setting required to obtain the adjusted turns ratio and switching the semiconductor switches within 500 ms (milliseconds), 300 ms or even within 200 ms upon detecting the change in the monitored voltage to change the tap of the electronic on-load tap changer to the new tap setting. In an embodiment, switching occurs within 100 ms upon detecting the change in the monitored voltage. For example, measuring the monitored voltage, determining the new tap setting and controlling the semiconductor switches to change to the new tap setting may all occur within 100 ms, or even within 80 or 60 ms. Relatively large voltage variations, for example on the power grid, can thus be compensated within a very short time. HVRT and LVRT requirements can thus be exceeded by far. The new tap setting may for example be determined responsive to the voltage on the secondary side reaching a respective upper or lower voltage limit.

Detecting a change in the monitored voltage and automatically controlling the semiconductor switches of the electronic on-load tap changer to adjust the turns ratio of the wind turbine transformer to compensate for the change may for example comprise: detecting if the voltage on the secondary side of the transformer reaches or exceeds a predefined upper or lower voltage limit (e.g., drops below the lower limit or rises above the upper limit); and if the predefined upper or lower voltage limit is reached or exceeded, adjusting the turns ratio of the wind turbine transformer so as to keep the voltage on the secondary side of the transformer within a predetermined voltage range determined by the upper and lower voltage limits. As indicated above, the voltage on the secondary side can be monitored, in particular measured, or it may be derived from the primary voltage if the primary voltage is monitored.

It should be clear that the upper and lower voltage limits within which the secondary voltage is to be kept are generally defined by an operator of manufacturer. The electrical power generating system, in particular a converter thereof, may operate with a nominal operating voltage on the secondary side of the transformer, and the upper and lower voltage limits may be set as a deviation from this nominal operating voltage, for example at 0.9 p.u. (lower limit) and 1.13 p.u. (upper limit), referenced to the nominal operating voltage. The limits may for example correspond to LVRT and HVRT thresholds. It may thereby be ensured that the wind turbine stays operational during low voltage/high voltage events on the grid. The voltage range within which the secondary voltage is kept by the tap changer can however also be narrower, for example between 0.95 p.u. (lower limit) and 1.12 p.u. (upper limit), or between 1.05 p.u. (lower limit) and 1.07 p.u. (upper limit). For operation in the former voltage range, the active and reactive power generating capabilities of the power generating system may be improved during steady state operation, while when operating in the latter voltage range, the maximum electrical efficiency and minimum power losses, in particular a maximal active/reactive power generating performance may be reached by the electrical power generating system. Accordingly, the lower limit (or threshold) may for example lie between 0.85 p.u. and 1.055 p.u. and the upper limit (or threshold) may lie between 1.065 p.u. and 1.14 p.u., referenced to the nominal operating voltage on the secondary side of the transformer.

The nominal operating voltage may be a fixed voltage that is determined by the configuration of the power generation system, in particular the converter configuration, e.g., of a DFIG system. It should be clear that in other embodiments, the limits for switching the tap changer may be referenced to the target voltage determined by the converter (e.g., the converter setpoint), in particular for a full converter solution.

It should further be clear that it depends on the resolution of the tap changer, i.e., on the percentage change of the secondary voltage with a tap change, how precisely the secondary voltage can be controlled. In particular, for a higher resolution of the tap changer (i.e., smaller voltage change associated with a tap change), the voltage can be kept in a narrower desired voltage range, whereas for a lower resolution, the limits may need to be set so as to define a larger voltage range. Accordingly, the limits to be used for the voltage on the secondary side may be set in dependence on the configuration of the tap changer that is available, or for a desired voltage range within which the secondary voltage should stay, the tap changer can be configured with a respective resolution.

The tap changer may for example be configured to effect a voltage change of less than 10%, or less than 6%, e.g., 5%, 3% or 2% on the secondary side when changing a tap on the primary side.

The resolution of the tap changer may in particular be configured to be high enough so that the voltage on the secondary side of the transformer can be controlled to stay within the voltage range defined by the upper and lower limits if the tap is changed.

It is further clear that for a given voltage change effected by a tap change, the number of taps determines the total voltage range within which the tap changer can adjust the voltage on the secondary side of the transformer. If the last tap is reached on either end, the voltage cannot further be adjusted by the tap changer and other measures may need to be employed, such as disconnecting the power generation system during an overvoltage event on the grid.

The electronic on-load tap changer may be configured to change between taps within 50 ms, or within 30 ms or even within 20 ms, i.e., the process of switching the semiconductor switches may occur within this amount of time. The switching may in particular occur within one grid period, i.e., within one period of the AC voltage of the power grid (for example within 20 ms for a 50 Hz grid or within 16.7 ms for a 60 Hz grid). By being able to change taps with such high speed, the total cycle time that includes detection of the voltage variation and determination of the new tap setting can be faster than 100 ms.

In an embodiment, adjusting the turns ratio of the wind turbine transformer by controlling the semiconductor switches comprises changing the current path through the respective transformer winding from a first tap to a second tap of the winding. Changing the current path comprises closing a second semiconductor switch coupled to the second tap to provide a connection from the first tap to the second tap via the second semiconductor switch and via a changeover impedance. A tap is generally a connection point to the respective winding, the tap changer allowing the selection of the connection point by selecting the respective tap. By providing a connection from the first tap to the second tap during tap changing, the tap can be changed on load without interruption of the current flow. The changeover impedance is an impedance that is configured to limit the currents during the tap changing process, in particular a short circuit current (which may also be termed transient current) occurring when the winding section between the first tap and the second tap is short circuited when closing the second semiconductor switch. The first and second taps can be adjacent taps on the same winding (i.e., neighboring taps without further taps in between), or can be distant taps that can have one, two, three or more further taps in between. Tap changing can accordingly occur from one tap to a distant tap with a single switching cycle, in particular by switching the semiconductor switches associated with the tap and with the distant tap. Switching between spaced apart taps thus becomes fast and efficient, as it is not necessary to repeatedly switch from one tap to the next neighboring tap to reach a distant tap, as in conventional tap changers.

Adjusting the turns ratio may further comprise opening a first semiconductor switch coupled to the first tap to interrupt the connection from the first tap to the second tap via the changeover impedance, wherein the second semiconductor switch remains closed and forms part of the current path through the respective transformer winding. The tap change can thus be completed fast and efficiently by making use of the first and second semiconductor switches and the changeover impedance. The first and second semiconductor switches are each part of a respective switching valve in which two antiparallel semiconductor switches are provided to account for the alternating character of the current to be switched. Antiparallel means that the switches are connected in parallel with an opposite direction in which the switches pass current. In some configurations, the semiconductor switches of the switching valve may also be connected in series (in particular connected 'anti-series', i.e., with opposite directions in which the current is controlled), e.g., when using IGBT or MOSFET switches. It should be clear that the switching valve can include more than two anti-parallel or anti-series connected semiconductor switches, e.g., two or more switches can be connected in series in the respective antiparallel path, or in the anti-series connection.

According to a further embodiment of the present invention, a wind turbine transformer having a primary side with a primary winding and a secondary side with a secondary winding is provided. The wind turbine transformer comprises an electronic on-load tap changer that comprises semiconductor switches. The semiconductor switches are connected and configured such that by controlling the semiconductor switches, the turns ratio of the primary winding to the secondary winding of the wind turbine transformer is adjustable to compensate for voltage changes on the primary side and/or the secondary side of the wind turbine transformer. With such wind turbine transformer, advantages similar to the ones outlined further above may be achieved. In particular, such wind turbine transformer allows the wind turbine to stay connected to the power grid even if the voltage of the power grid varies significantly. By such electronic on-load tap changer, the transformation ratio can furthermore be adjusted fast enough so that HVRT and LVRT requirements can be met. The tap changer changes the connection point to the transformer winding, thereby effecting the addition or removal of turns to the current path through the winding. In an embodiment, the tap changer is provided on the primary winding of the wind turbine transformer, i.e., on the grid side of the wind turbine transformer.

In an embodiment, the electronic on-load tap changer comprises plural taps connected to the same transformer winding, wherein the plural taps comprise one or more taps to which a changeover impedance is coupled and one or more taps to which no changeover impedance is coupled. A tap to which no changeover impedance is coupled is neighbored by at least one tap to which a changeover impedance is coupled (i.e., there is no further tap between these neighboring taps). In such configuration, when changing from one tap to a neighboring tap, it can be ensured that a changeover impedance is present in the circuit which limits currents through the respective section of transformer winding.

To each tap, a switching valve comprising a semiconductor switch is coupled. A switching valve may for example comprise two semiconductor switches connected antiparallel or connected in series (in particular connected 'anti-series'), depending on the type of semiconductor switch. The switching valve can be connected directly to the respective tap or can be connected via the changeover impedance to the respective tap.

The on-load tap changer can for example comprise a first tap and a second tap connected to the same transformer winding, wherein a first switching valve including a semiconductor switch is coupled to the first tap, a second switching valve including a semiconductor switch is coupled to the second tap, and a changeover impedance is connected in series with the first switching valve or with the second switching valve. The first and second switching valves are coupled together such that by closing the first and second switching valves, an electrical connection is established from the first tap to the second tap via the first switching valve, the changeover impedance and the second switching valve. This does not imply any order in which these elements are connected; the changeover impedance may for example be connected between the first tap and the first switching valve. Such configuration allows a fast, safe, and efficient tap changing with relatively few electronic components. In an embodiment, only a single changeover impedance is present in the connection between the first and second tap when closing the first and second switching valves.

The changeover impedance may be resistor, and inductance, or a semiconductor, or a combination thereof. In an embodiment, the changeover impedance is provided by an inductance.

In an embodiment, the electronic tap changer comprises one, two, three or more tap changer modules. Each tap changer module comprises a first arm connected at one end to a first tap of the respective transformer winding and a second arm connected at one end to a second tap of the transformer winding. The other ends of the first and second arms are connected together at a connection point. Each arm comprises at least one semiconductor switch to switch on and off a current path via the respective tap. At least one of the arms comprises a changeover impedance connected in series with the semiconductor switch. One of the arms may not comprise a changeover impedance.

In other configurations, each arm can include a changeover impedance. Each changeover impedance may contribute for example half of the impedance value necessary for limiting the short circuit current occurring during the switching from a first tap to a second tap.

As the short circuit currents or transient currents may be highest when switching from the first tap to the last tap, the changeover impedance may be dimensioned such that the respective short circuit current can be handled by the on-load tap changer.

In an embodiment, the tap changer module includes the first and second arms and further includes a third arm which is connected at one end to a third tap of the transformer winding and at its other end to the connection point. The third arm comprises a semiconductor switch to switch on and off a current path via the third tap. The second tap is located between the first and the third tap. A changeover impedance is provided in two of the three arms, in particular in the first and third arms, and is connected in series with the respective semiconductor switch, in particular with a respective switching valve. Such configuration allows a modular and compact design of the electronic on-load tap changer. Other configurations are conceivable, such as using modules with two arms, four arms, five arms, six arms or more. A combination of such tap changer modules may also be used.

The connection point is for example connected to a terminal of the wind turbine transformer, to a further tap of the respective transformer winding (in particular a tap of a further tap changer module, such as a neighboring tap of a neighboring tap changer module) or may be connected to the connection point of a further tap changer module. Two or more tap changer modules may thus be coupled together.

In an embodiment, a tap changer module is associated with or comprises a switchable part of the winding to which the tap changer is coupled (switchable means that it can be inserted or taken out of the current path through the respective winding by the tap changer). The switchable part of the winding associated with one tap changer module is electrically separated from the switchable winding parts of the one or more other tap changer modules, i.e., the switchable parts of the winding associated with different tap changer modules are electrically not directly connected together, but are only connectable via the respective tap changer modules. Such configuration has the advantage that the voltages to which the semiconductor switches are exposed can be limited, while it is still possible to provide tap changing over a significant voltage range that exceeds the voltage handling capability of the semiconductor switches. It should be clear that each tap changer module can include two, three, four, five or more taps provided on the same switchable winding part.

The transformer winding to which the tap changer is coupled, such as the primary winding, may for example be split into two, three or more parts, wherein a corresponding number of tap changer modules is provided. For example, the winding may be split such that the voltage occurring across the switchable winding part associated with a tap changer module is smaller than 12 kV, or smaller than 10 or 8 kV, at nominal operating conditions of the transformer. It should be clear that in some configurations, only a single tap changer module may be provided and the winding may not be split.

The switchable parts of the transformer winding may be coupled together by connecting the connection points of the respective tap changer modules together or by connecting the connection point of one tap changer module on one winding part to a tap of another winding part, in particular to a tap of a neighboring tap changer module that is provided at the (neighboring) end of the associated winding part.

With such configuration, the voltage variation capabilities of the tap changer can be extended to high voltages, while requiring only a minimum amount of electric and electronic components, in particular semiconductor switches and changeover impedances.

The transformer terminals can be connected to a connection point of a tap changer module provided on an end of the respective transformer winding, or to an end of a non-switchable part of the transformer winding.

In an embodiment, the semiconductor switches are controlled such that switching occurs at a zero-crossing of the current through the semiconductor switch that is to be switched, in particular at a zero crossing of the current in the winding to which the electronic on-load tap changer is coupled. As the current is an alternating current, its value has zero crossings during each period of the AC waveform. By synchronizing the switching to such zero-crossing, in particular when switching off the semiconductor switch, switching transients and disturbance of the waveform are minimized. In an embodiment, the tap changer is provided on the primary winding and the switching is performed at a zero crossing of the current in the primary winding.

The semiconductor switches are thyristors, yet other semiconductor switches may be used, such as IGBTs (insulated-gate bipolar transistor), GTOs (gate turn-off thyristor), IGCTs (integrated gate-commutated thyristor), MOSFETs (metal-oxide-semiconductor field-effect transistors), or semiconductor switches employing WBG (wide band gap) semiconductors. The use of thyristors is particularly beneficial as they allow the switching at a zero current crossing, so as to achieve a fast and clean tap changing transient. In particular, the thyristor switch-off process does not require zero current crossing detection by the controller.

In an embodiment, the semiconductor switches are light triggered semiconductor switches or electrically triggered semiconductor switches that are optically controlled. For example, light triggered thyristors (LTT) may be used. In another example, semiconductor switches may be used the gate driver of which is electrically isolated and is optically powered, driven and controlled by a light signal. The semiconductor switches can thus be optically controlled. The use of such light controlled semiconductor switches facilitates control and reduces interference by electromagnetic fields which are present close to the transformer windings. It further reduces the voltage isolation requirements of the thyristor drivers.

In an embodiment, the wind turbine transformer is a three-phase transformer, wherein a primary winding, at least one secondary winding and a tap changer are provided for each phase of the three-phase transformer. The windings may be delta-connected at the primary side and star-connected at the secondary side.

The transformer may have one, two or more secondary windings (in particular for each phase). For example, the transformer may comprise one secondary winding for a low or medium voltage range. In another example, the transformer may comprise two secondary windings. One secondary winding may be provided for a low voltage range, and one secondary winding may be provided for a medium voltage range. Other configurations are certainly conceivable, such as providing two low voltage or two medium voltage secondary windings. In a typical application, the transformer can include two secondary windings, one operating in a range of 300-900 V (e.g., at 690 V) and the other in a range of 2000-5000 V (e.g., at 3000 V). The lower voltage winding may for example be coupled to a rotor of a DFIG (via a converter) and the higher voltage winding may be coupled to a stator of the DFIG.

If two or more secondary windings are present, the voltage on the secondary side may be monitored at either one of the secondary windings or at both secondary windings. The tap changer is then provided on the primary winding so that by changing the tap setting, grid voltage disturbances are automatically compensated for both secondary windings.

The transformer can be a dry type transformer or an oil type transformer, it may also be of the autotransformer type.

According to a further embodiment of the present invention, a wind turbine electrical system is provided, which comprises a wind turbine transformer in any of the above-described configurations. Furthermore, the system includes a control system that is coupled to the electronic on-load tap changer of the wind turbine transformer to control the turns ratio. The control system is configured to perform the steps of any of the above-described methods.

The control system may comprise a converter controller of a converter of the wind turbine electrical system, wherein the converter controller may be configured to control the electronic on-load tap changer. A fast and efficient control of the tap changer may thus be achieved. The combination of such fast control and fast switching times may lead to a significantly improved reaction time to voltage changes of the wind turbine electrical system and accordingly to improved HVRT/LVRT capabilities.

The control system may for example include a controller that generates a control signal to change the turns ratio of the transformer, and may further include a tap changer driver that drives the semiconductor switches in accordance with such control signal.

In an embodiment, the wind turbine electrical system further includes a converter, wherein the control system comprises a converter controller of the converter. The converter controller is configured to define an operating point for the converter and to derive therefrom a target operating voltage to be provided on the secondary side of the transformer. Based on the target operating voltage, the converter controller adjusts the turns ratio of the transformer. Accordingly, for a given grid voltage on the primary side of the wind turbine transformer, the wind turbine electrical system allows operation of the converter at different operating points resulting in different voltages on the transformer secondary side. The flexibility for operation of the converter and of the wind turbine is thus increased, and the advantages outlined further above can be achieved.

The wind turbine electrical system may comprise the electrical power generating system which includes the converter, and which may further include the generator. The secondary side of the wind turbine transformer is directly connected to the electrical power generating system. It may be directly connected to the converter in a full converter topology, or it may be connected to the converter and to the generator in a doubly-fed induction generator (DFIG) topology.

According to a further embodiment of the present invention, an electronic on-load tap changer comprising at least one, or at least two tap changer modules is provided. Each tap changer module comprises a first arm configured to be connected to one end to a first tap of a respective transformer winding and comprising a first switching valve with a semiconductor switch, and a second arm configured to be connected at one end to a second tap of the transformer winding and comprising a second switching valve with a semiconductor switch, wherein the other ends of the first and second arms are connected together at a connection point. Each switching valve is configured to switch on and off a current path via the respective tap. At least one of the first and second arms comprises a changeover impedance connected in series with the respective switching valve and one of the first and second arms does not comprise a changeover impedance. In other configurations, each arm can comprise a changeover impedance, each impedance contributing for example half of the impedance value for limiting the short circuit current. The configuration may in particular be such that when the switching valves are closed, an electrical connection is stablished from the first tap to the second tap via the first switching valve, the changeover impedance and the second switching valve. Such tap changer allows a fast, safe and efficient on-load tap changing and the achieving of the further advantages outlined above.

The tap changer may furthermore comprise a driver coupled to control inputs, in particular gate inputs, of the semiconductor switches. The driver may be connectable to a control unit for receiving commands for switching to a specified tap, so as to adjust the turns ratio of a respective transformer.

The electronic tap changer may have any of the above-described configurations and may in particular include any of the above-described features, such as the above mentioned one, two or more tap changer modules with two, three or more arms, or light controlled semiconductor switches, in particular thyristors.

It is to be understood that the features mentioned above and those yet to be explained below can be used not only in the respective combinations indicated, but also in other combinations or in isolation, without leaving the scope of embodiments of the present invention.

BRIEF DESCRIPTION

Some of the embodiments will be described in detail, with reference to the following figures, wherein like designations denote like members, wherein:

FIG. 3 is a schematic drawing showing a wind turbine electrical system including a wind turbine transformer according to an embodiment of the invention, wherein the drawing illustrates control and communication diagrams;

FIG. 4 is a schematic drawing showing a wind turbine electrical system including a wind turbine transformer according to an embodiment of the invention, wherein the drawing illustrates control and communication diagrams;

Figure 6:
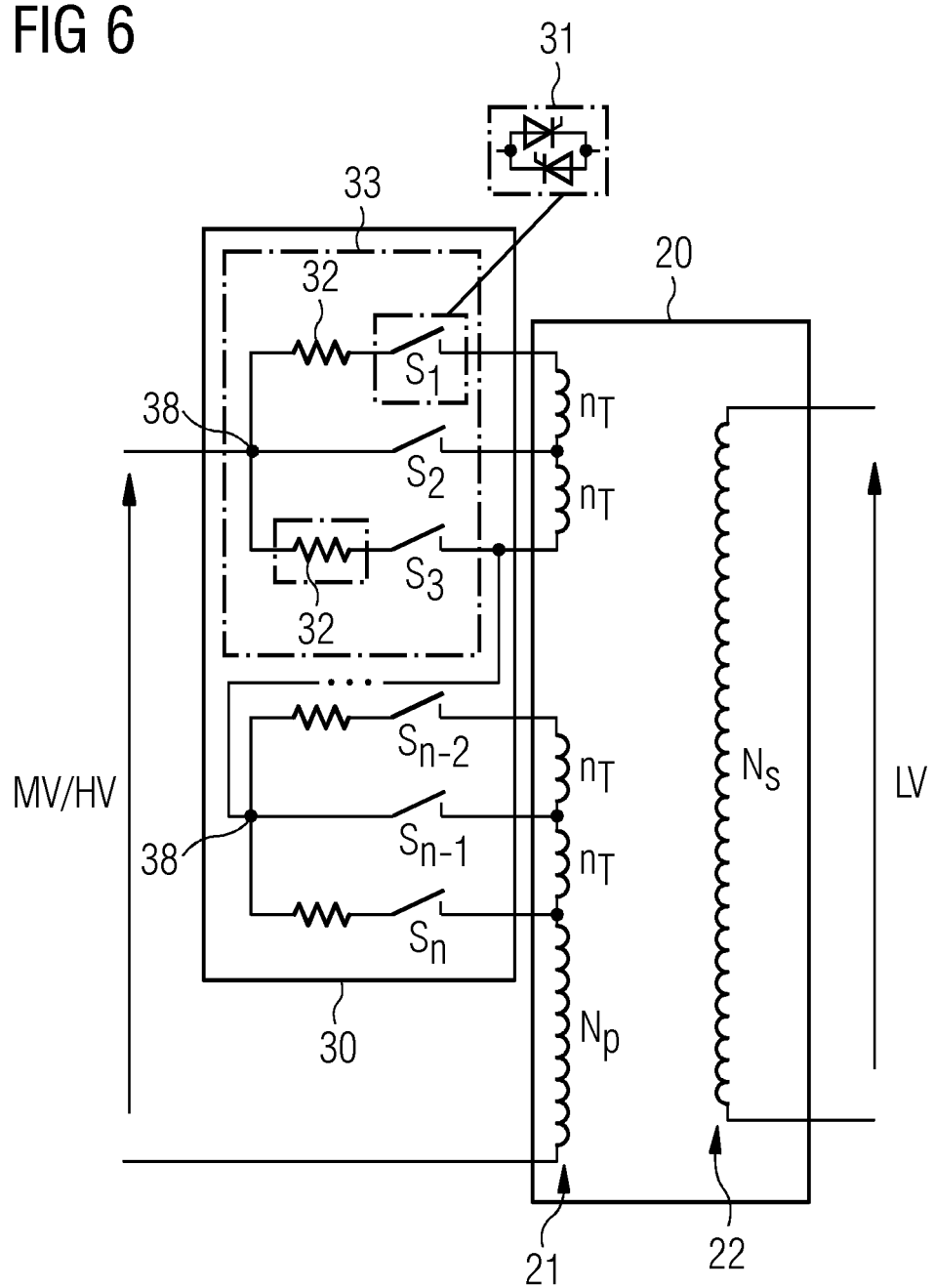
Figure 7:
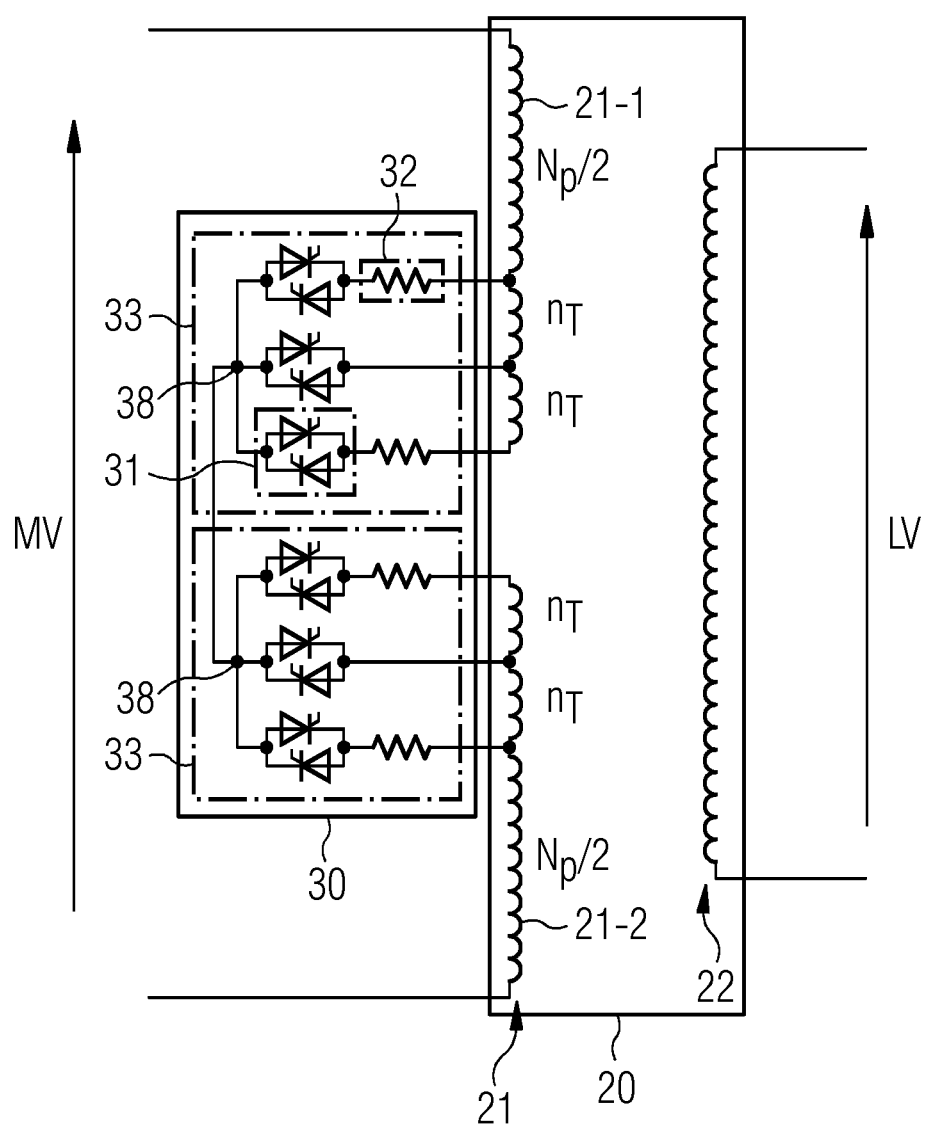
Figure 8:
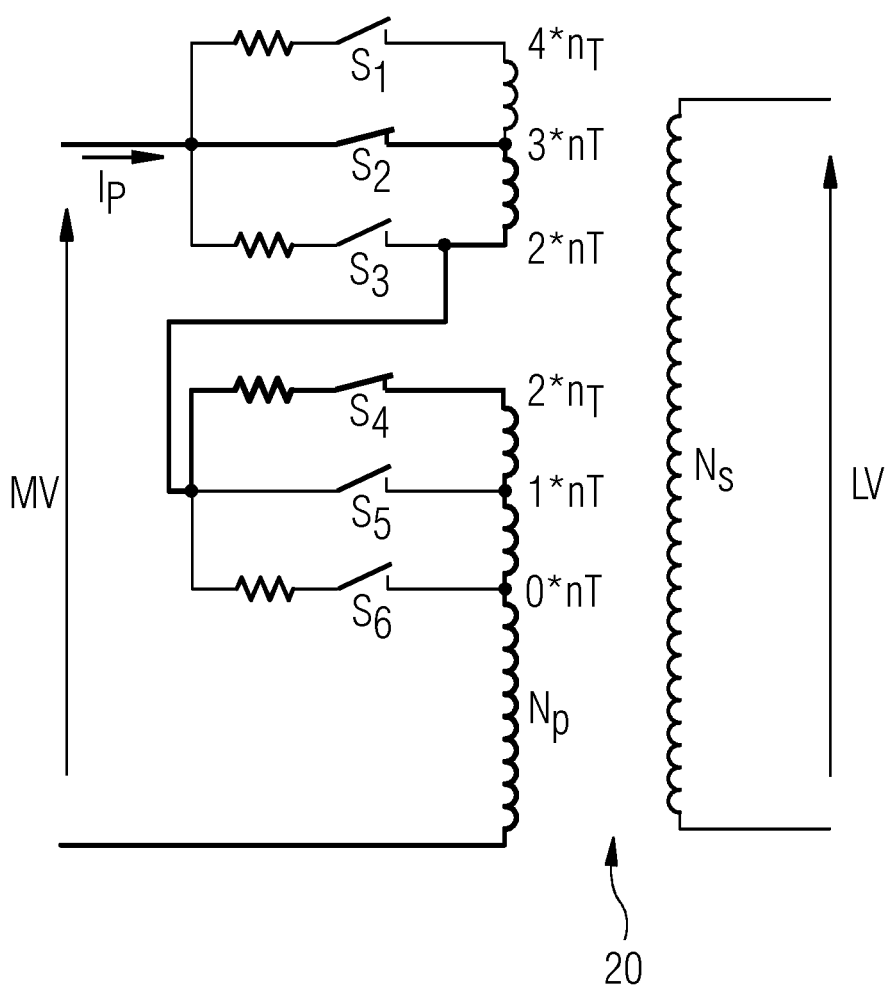
Figure 9:
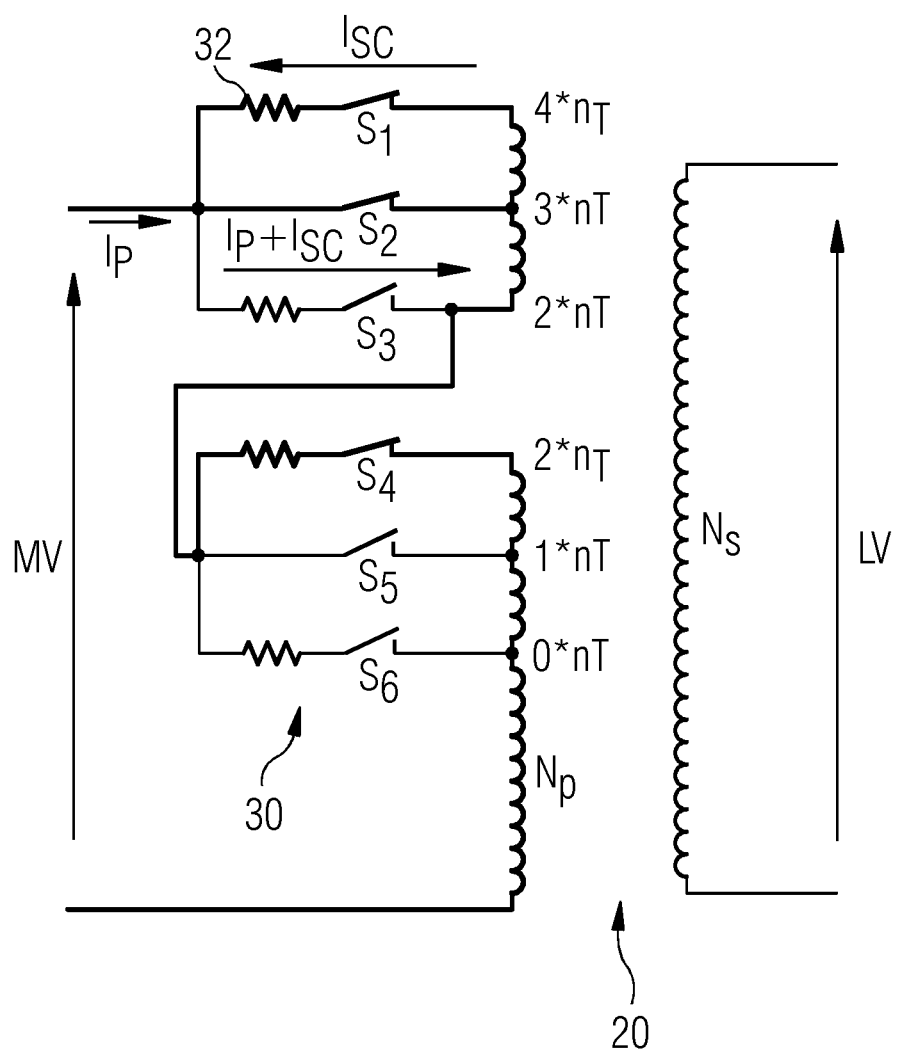
Figure 10:
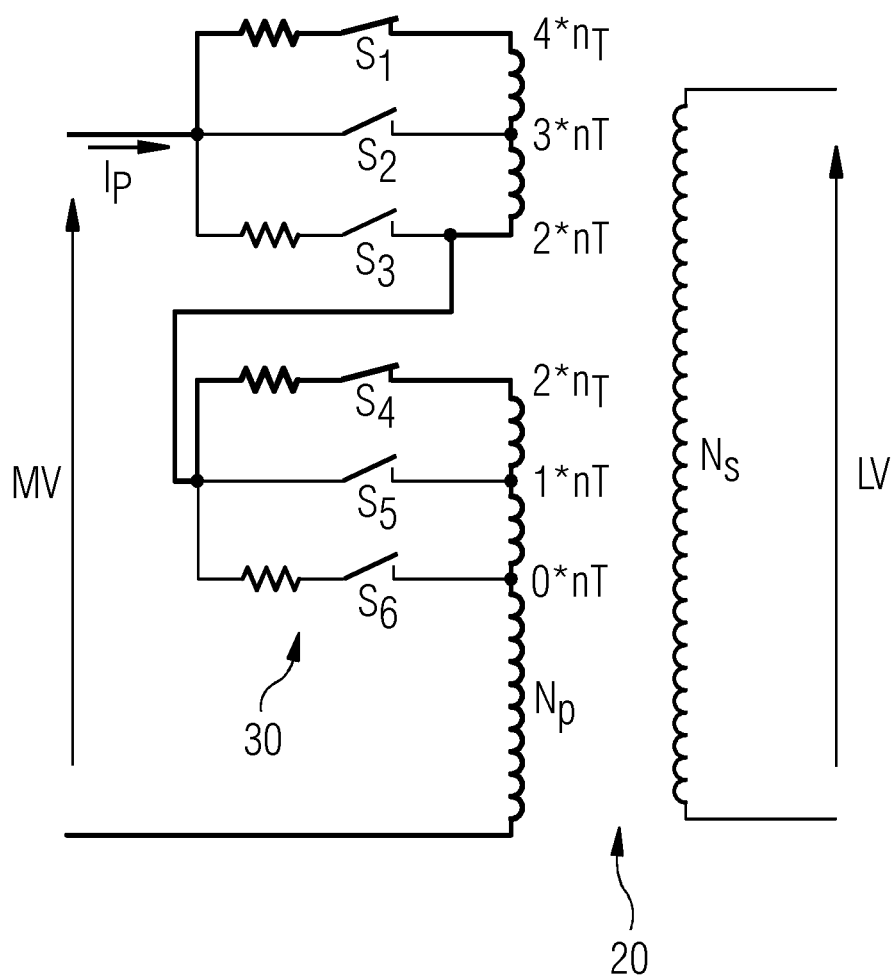
Figure 11:
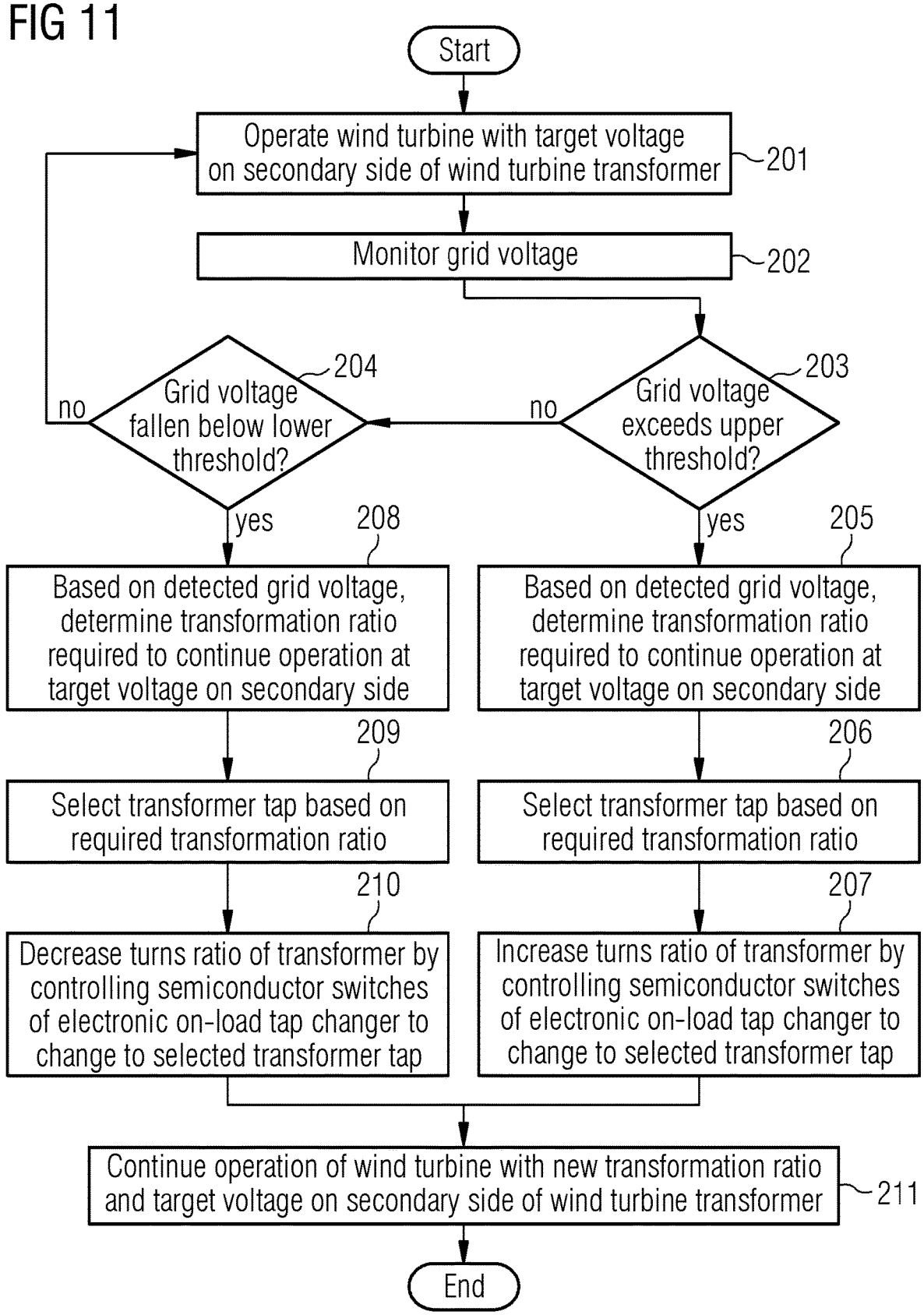
Figure 12:
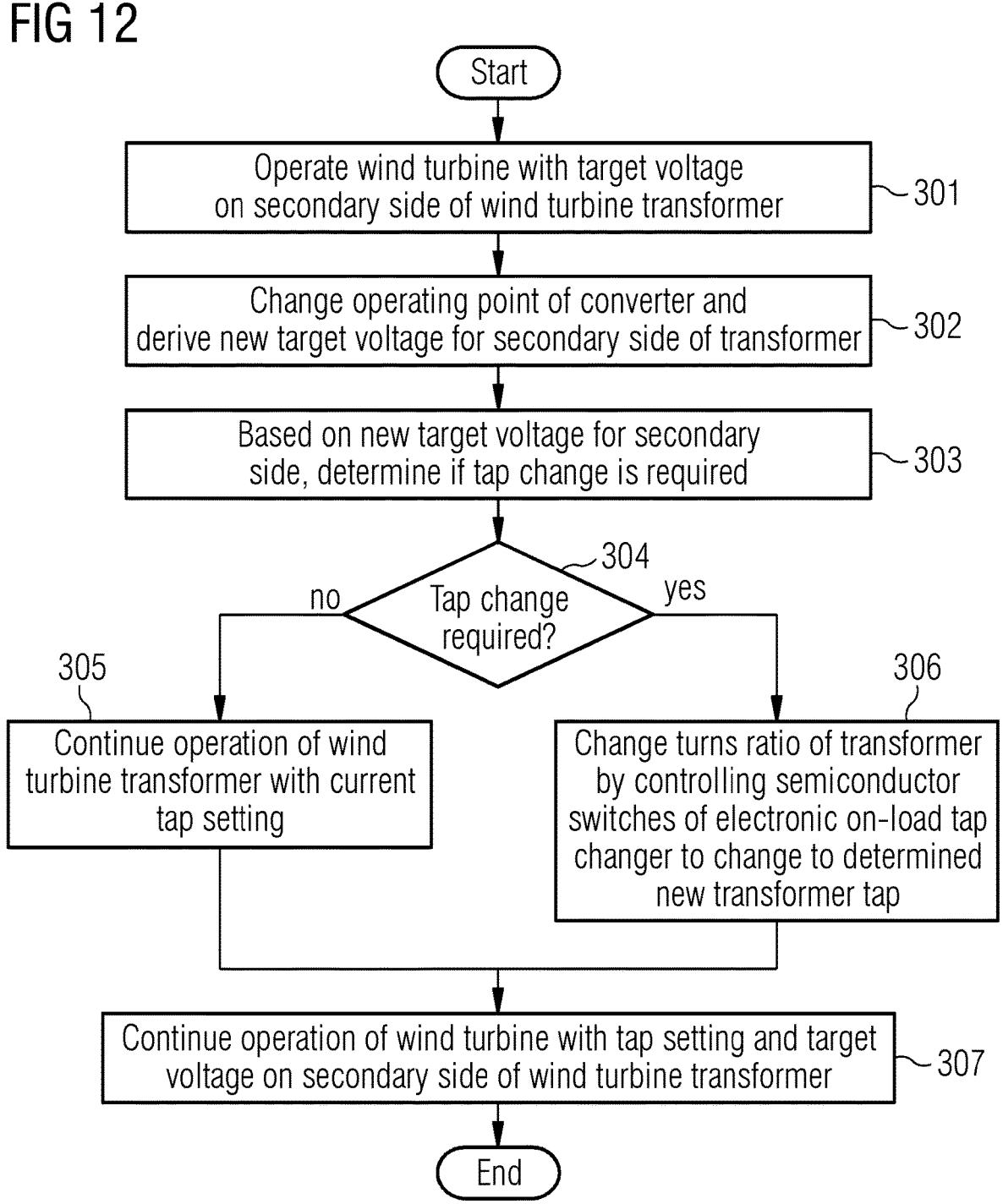

FIG. 6 is a schematic drawing showing a wind turbine transformer including an electronic on-load tap changer according to an embodiment of the invention FIG. 7 is a schematic drawing showing a wind turbine transformer including an electronic on-load tap changer according to an embodiment of the invention FIG. 8 is a schematic drawing showing a switching sequence of an electronic on-load tap changer in accordance with an embodiment of the invention;

FIG. 9 is a schematic drawing showing a switching sequence of an electronic on-load tap changer in accordance with an embodiment of the invention;

FIG. 10 is a schematic drawing showing a switching sequence of an electronic on-load tap changer in accordance with an embodiment of the invention;

FIG. 11 is a flow diagram illustrating a method according to an embodiment of the invention; and FIG. 12 is a flow diagram illustrating a method according to an embodiment of the invention.

DETAILED DESCRIPTION

In the following, embodiments of the invention will be described in detail with reference to the accompanying drawings. It is to be understood that the following description of the embodiments is given only for the purpose of illustration and is not to be taken in a limiting sense. It should be noted that the drawings are to be regarded as being schematic representations only, and elements in the drawings are not necessarily to scale with each other. Rather, the representation of the various elements is chosen such that their function and general purpose become apparent to a person skilled in the art. As used herein, the singular forms "a," "an," and "the" are intended to include the plural forms as well, unless the context clearly indicates otherwise. The terms "comprising," "having," "including," and "containing" are to be construed as open-ended terms (i.e., meaning "including, but not limited to,") unless otherwise noted.

Figure 1:
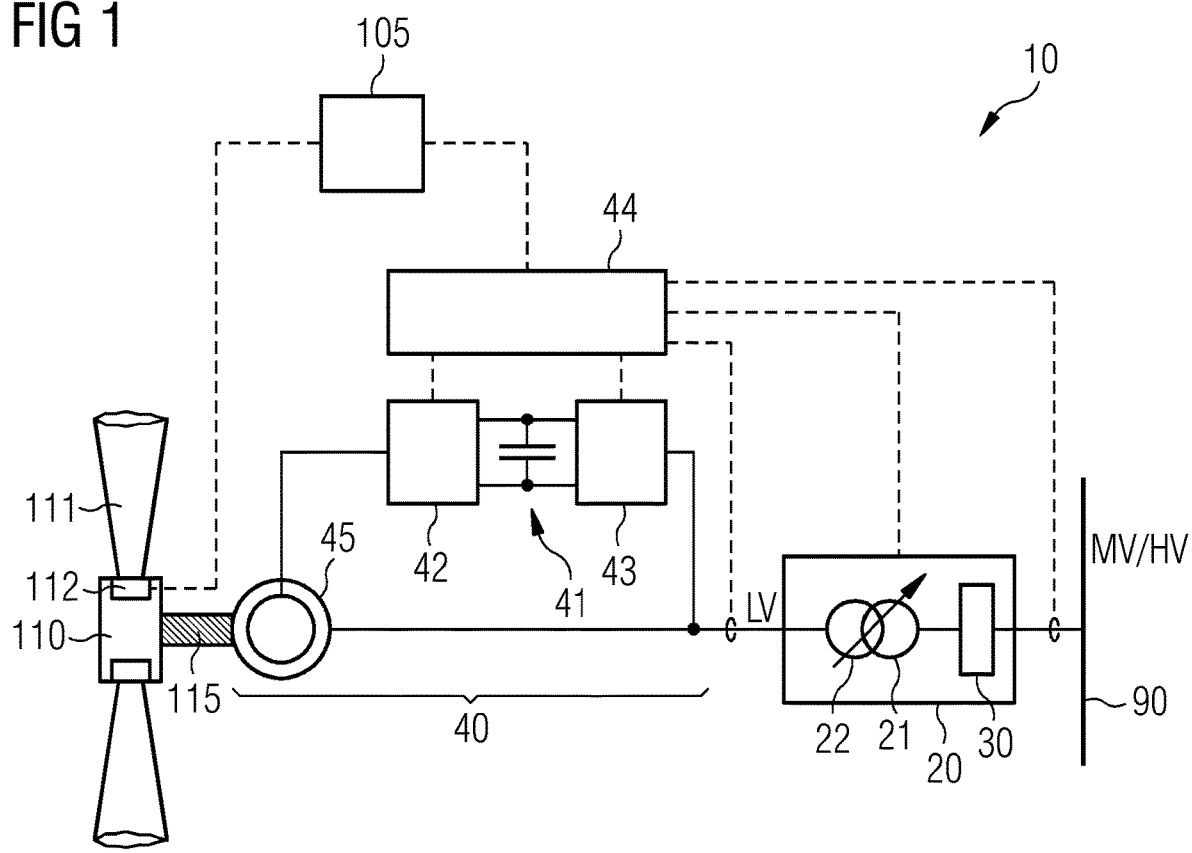
FIG. 1 is a schematic drawing showing a wind turbine electrical system according to an embodiment of the invention.

FIG. 1 is a schematic drawing showing a wind turbine electrical system 10 including an electrical power generating system 40 and a wind turbine transformer 20. The transformer 20 is connected between the electrical power generating system 40 and a power grid 90 and provides transformation of the generated electrical power to the grid voltage. Power grid 90 may for example be the medium voltage system of a power supply network, or may be a medium voltage wind farm grid that is connected via a substation to a high voltage system of the power supply network. Power grid 90 may also be a high voltage power grid.

The electrical power generating system 40 includes a generator 45 and a converter 41. In the example of FIG. 1, the generator 45 is a doubly-fed induction generator (DFIG), the stator of which is directly connected to the transformer 20, and the rotor of which is connected to converter 41. Generator 45 is driven by a rotor 110 of the wind turbine having blades 111. Rotor 110 is coupled to generator 45 via a shaft 115 and a gear box (not shown). The wind turbine may include a pitch adjustment mechanism 112 to adjust a pitch angle of rotor blades 111, which can be controlled by a wind turbine controller 105. The wind turbine controller 105 can thereby optimize the pitch angle of the rotor blades to maximize the aerodynamic efficiency and to achieve an optimum tip-speed ratio.

Converter 41 comprises a generator side converter 42 and a grid side converter 43, which can act either as inverter or rectifier, depending on the direction of the power flow. Converter 41 is controlled by a converter controller 44. By adjusting the frequency of the currents in the rotor of generator 45, the converter 41 allows operation of the wind turbine with variable speed while ensuring that the electrical power is supplied to the grid at the required frequency. Converter controller 44 may further adjust the operating point of the converter 41 to control a power factor of the power generating system 40, for example when required to provide reactive power to the power grid 90.

The transformer 20 includes a grid side winding 21, which is herein also termed primary winding or MV/HV winding. It further includes a generator side winding 22, herein also termed secondary winding. In the examples provided herein, the secondary winding is a LV winding. It should be clear that the secondary winding may also be a MV winding, and that one, two or more secondary windings can be provided for each phase (e.g., an LV secondary winding and an MV secondary winding, two LV secondary windings, or two MV secondary windings). It should be clear that the wind turbine electrical system 10 is generally a three-phase system, and wind turbine transformer 20 is a three-phase transformer, so respective transformer windings are provided for each phase and are coupled together in a star or delta configuration, as common for wind turbine transformers. Transformer 20 provides transformation of the generated electrical power from the low voltage level LV (or medium voltage level MV, if applicable) to the medium or high voltage level MV/HV in accordance with its transformation ratio that is determined by the turns ratio of the primary winding 21 to the secondary winding 22. The voltages V on either side of the transformer 20 are related to the number of turns N of the primary (P) and secondary (S) winding by: $\alpha = V_P/V_S = N_P/N_S$, wherein $\alpha$ designates the turns ratio.

In general, low voltage (LV) designates a voltage range between 0 and 1000 V (values are in RMS), wherein a typical value for the voltage on the secondary (LV) side of the transformer is 690 V for a low voltage secondary winding and 3000 V for a medium voltage secondary winding. Medium voltage (MV) generally designates a voltage between 1000 V and 35 kV. High voltage (HV) generally designates a voltage above 35 kV, for example in a range between 35 kV and 1 MV. A typical value for the voltage on the primary (MV) side of the transformer lies in a range of 15 kV to 35 kV.

Wind turbine transformer 20 comprises a tap changer 30 that allows the selection of a connection point to a respective transformer winding so that the number of turns of the winding can be adjusted by selecting a respective tap. In an embodiment, the tap changer 30 is provided on the primary winding 21, as the currents are lower on the primary side. In other embodiments, a tap changer may be provided on the secondary winding 22. Tap changer 30 is an electronic tap changer which comprises semiconductor switches to establish the connection to the taps of the respective winding. It is further an on-load tap changer, meaning that it can switch between taps without interrupting the current flow between the power generating system 40 and the power grid 90.

The electronic on-load tap changer 30 is controlled by the converter controller 44. Alternatively, a separate controller may be provided, or the wind turbine controller 105 may control the tap changer. As indicated in FIG. 1, the converter controller 44 can monitor the grid voltage on the primary side of the transformer and the low voltage LV on the secondary side of the transformer. Converter controller 44 is configured to adjust the transformation ratio of wind turbine transformer 20 by controlling the turns ratio using the tap changer 30 so as to compensate voltage variations on the primary side and/or on the secondary side of the transformer 20. If the grid voltage changes, for example due to high or low voltage conditions on the grid or a grid fault, the controller adjusts the turns ratio such that the voltage on the secondary side stays essentially constant, in particular remains within predefined limits. As the resolution of the tap changer is limited (determined by the number of turns that are switched which each tap), a small variation of the voltage on the secondary side may certainly occur.

As the tap changer 30 can switch between taps very fast, for example within 30 or within 20 ms, the electrical system 10 can immediately react to power grid voltage variations. The tap changer can in particular be configured to switch taps within one grid period in each phase, for example in less than 20 ms for 50 Hz grid frequency and in less than 16.67 ms for 60 Hz grid frequency. Over-voltage and under-voltage conditions on the low voltage side, which would otherwise trigger a safety mechanism that disconnects the wind turbine from the power grid 90, can thus be prevented. Such safety mechanism may comprise a circuit breaker between the transformer 20 and the power grid 90, and between the transformer 20 and the converter 41 and the generator 45, which can be triggered by the converter controller 44 or the wind turbine controller 105 upon detecting a respective voltage condition.

Furthermore, the tap changer 30 allows a variation of the voltage range on the secondary side of the transformer 20. The monitored voltage may for example be a target voltage for the low voltage side, which the converter controller 44 determines such that the wind turbine operates at a maximum efficiency. If the wind conditions change, the converter controller 44 can adjust the target voltage, and in response adjust the tap of the tap changer 30 to achieve a transformation ratio that transforms the new target voltage to the given grid voltage. Similarly, in a situation in which more reactive power is to be delivered to the power grid, a significant voltage increase may be experience at the secondary side for a fixed transformation ratio. Converter controller 44 again adjusts the turns ratio of transformer 20 by the tap changer 30 to allow operation on the low voltage side within safe voltage limits. The reactive power generating capabilities of the power generating system 40 may thus be fully exploited without being restricted by voltage limitations on the secondary side of the transformer.

Figure 2:
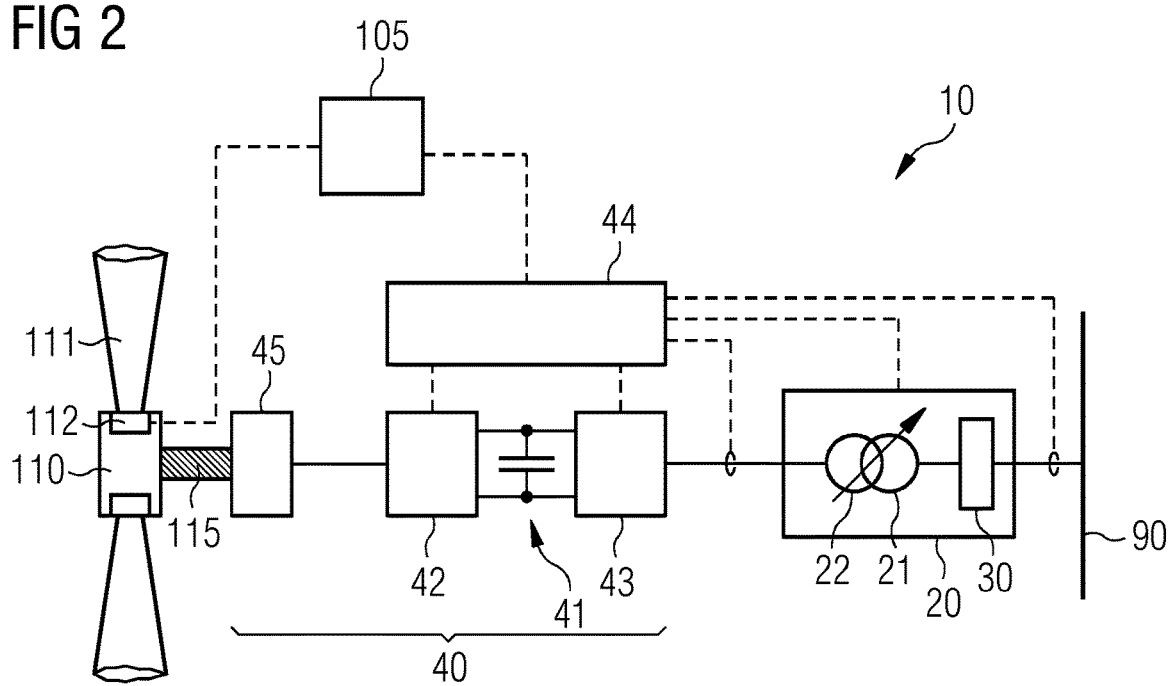
FIG. 2 is a schematic drawing showing a wind turbine electrical system according to an embodiment of the invention.

FIG. 2 illustrates a further embodiment of the wind turbine electrical system 10, which is a modification of the system 10 of FIG. 1. The above explanations thus equally apply to the system 10 of FIG. 2. The embodiment of FIG. 2 comprises a full converter topology, wherein the converter 41 receives the full output of the generator 45. The grid side converter 43 is directly connected to the transformer 20, wherein the direct connection may certainly comprise a circuit breaker or similar element. A gear box may be provided between rotor 110 and generator 45, or a direct drive configuration may be employed, in which the rotor 110 directly drives the generator 45. The full converter topology provides improved flexibility regarding the speed of rotor 110. In the example of FIG. 2, the generator 45 can be implemented as a permanent magnet generator.

Again, by the electronic tap changer 30, the voltage on the low voltage side of the transformer 20 can be kept relatively constant when over- and under-voltages or faults occur in power grid 90. On the other hand, the electronic on-load tap changer 30 provides enhanced flexibility for the voltage on the secondary side of the transformer 20, so that the converter 41 can adjust its operating point in order to maximize the systems power generating efficiency, or to provide maximum reactive power.

It should be clear that FIGS. 1 and 2 illustrate only some exemplary configurations of the power generating system of the wind turbine, and that embodiments of the present invention can be used with all types of power generating systems. It can for example be used with fixed speed wind turbines having a respective fixed speed generator topology, or with variable speed wind turbines. Other types of generators can be used in the power generating system, such as a wound rotor induction generator (WRIG; variable speed) or a squirrel cage induction generator (SCIG; fixed speed). Further, different types of converters can be used, in particular in the variable speed configurations. Such converters include for example modular converters, such as the modular multilevel converter (MMC or M2C). Also, it should be clear that the power generating system can comprise additional components that are not shown and further described herein, such as circuit breakers (e.g., between transformer and converter and between converter and generator, and/or between transformer and generator), soft starters and the like. Embodiments of the present invention are generally applicable to all types of wind turbine power generation systems.

Further, the schematic drawings show only one phase and one primary and secondary winding of the transformer. It should be clear that the transformer can have multiple secondary windings, e.g., two, three or more. Several secondary windings can for example be provided for coupling to two systems, or to reduce the level of harmonics. For example, in a DFIG configuration as shown in FIG. 1, one secondary winding (low voltage) can be coupled to the converter 41 and one secondary winding (medium voltage) can be coupled to the stator of generator 45. A further example is a perfect harmony converter topology wherein the converter is coupled to a plurality of secondary windings (e.g., 4 or more for each phase). Further, it should be clear that the transformer can be a three-phase transformer.

FIG. 3 shows a possibility of how the control can be implemented in any of the above-described wind turbine electrical systems 10 or wind turbine transformers 20. The transformer 20 can include a tap changer driver 23 that controls the individual semiconductor switches. Driver 23 comprises in particular connections to the control terminals of the semiconductor switches, such as to the gates of thyristors, IGBTs, GTOs, IGCTs, MOSFETs, semiconductor switches employing wide band gap semiconductors, or the like. As mentioned, optically triggered semiconductor switches may be used, so that the connections can include optical connections (e.g., via optical fibers) to the optical gates of such semiconductor switches, in particular to LTTs. The converter 41 can include a transducer 46 that is configured to provide communication with the tap changer driver 23, it may in particular be configured to communicate using a communication protocol that is understood by the tap changer driver 23. The converter controller 44 communicates with the driver 23 via the transducer 46. Controller converter 44 can transmit to driver 23 a control command to adjust the tap setting of tap changers 30, and it may request from driver 23 the current tap setting. It may further request the system status to check if there is any fault in the tap changer module. Converter controller 44 can thus obtain information on the current transformation ratio of the transformer and can adjust the transformation ratio in accordance with current grid voltage conditions or a desired operating voltage on the low voltage side. For the communication between the transducer 46 and the driver 23, different communication methods may be used, such as fiber optics, interbus, controller area network (CAN) bus or other digital signal communication.

As indicated in FIG. 3, the primary winding 21, i.e., the grid side winding, includes a delta connection of the three phase primary windings. For the secondary winding 22, the windings for the three phases are star (wye) connected and an additional connection is provided to the neutral point (ground or earth connection). Other configurations are conceivable, e.g., star or delta connected windings on each transformer side, star connection on the primary winding and delta connection on the secondary winding. As outlined above, one, two or more secondary windings can be provided on the secondary side.

The converter controller 44, the transducer 46 and the driver 23 form part of a control system 50. The control system 50 may implement any of the above and below described control methods. It may in particular adjust the turns ratio of transformer 20 by controlling the tap changer 30 so as to compensate voltage variations on the power grid 90 or on the secondary side of transformer 20. It should be clear that other configurations are conceivable. The control system 50 may for example comprise only a single controller which can be implemented in the transformer 20 and include the driver 23 and furthermore implement the control methods described herein.

As shown in FIG. 4, the transducer 46 is optional, it can in particular be avoided if the converter controller 44 can directly communicate with driver 23. A communication protocol commonly used by converter controllers may be used for such communication, or the converter controller 44 may additionally be equipped with the capability to communicate using a protocol understood by driver 23.

The control system 50, in particular the converter controller 44, may comprise a processing unit, such as a microprocessor, FPGA, PLD (Programmable Logic Device), or DSP (digital signal processor), and a memory (such as RAM, ROM, flash memory or a hard disc drive) that stores control instructions which when executed by the processing unit perform any of the methods described herein.

Figure 5:
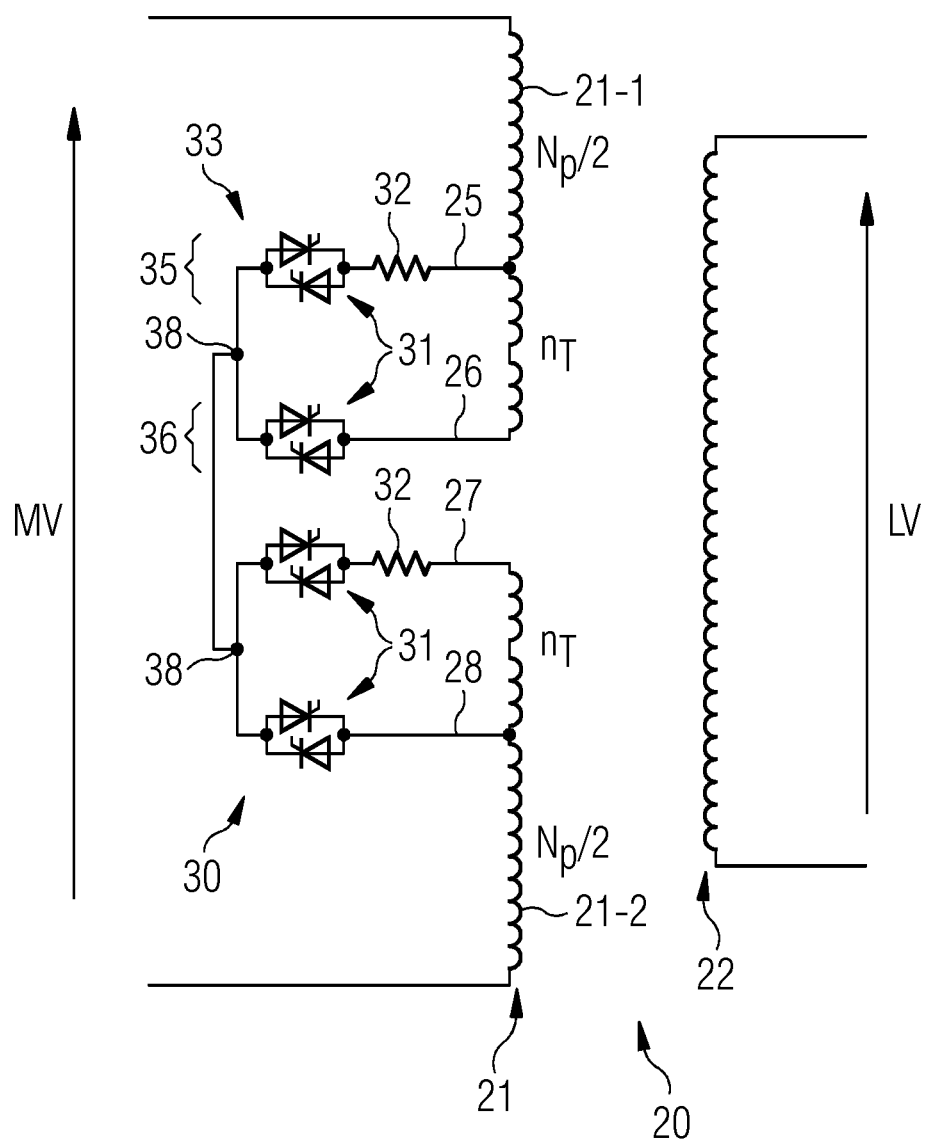
FIG. 5 is a schematic drawing showing a wind turbine transformer including an electronic on-load tap changer according to an embodiment of the invention.

FIG. 5 is a circuit diagram showing a particular implementation of the tap changer 30 which can be used in any of the above-described embodiments. The primary winding 21 is divided or split into two parts 21-1 and 22-2, each having $N_P/2+n_T$ turns. On the first part 21-1, a first tap 25 and a second tap 26 are provided. The tap changer 30 includes a tap changer module 33 comprising a first arm 35 and a second arm 36. In the first arm 35, a switching valve 31 and a changeover impedance 32 are connected in series to the first tap 25. In the second arm 36, a switching valve 31 is connected to the second tap 26. First and second arms 35, 36 are connected together at a connection point 38. The tap changer module is associated with or comprises a switchable part of the transformer winding, which is the winding part between the outer taps of the tap changer module 33, i.e., between taps 25 and 26 in the example of FIG. 5.

The tap changer module 33 can include further arms, wherein it is desirable that an arm comprising a changeover impedance 32 is neighbored by an arm not comprising a changeover impedance 32, each arm being coupled to a respective tap of the first winding part 21-1. Tap changer module 33 may for example comprise 2, 3, 4, 5 or even more arms. It is noted that alternatively, a changeover impedance can be provided in each arm of the tap changer module 33.

On the third and fourth taps 27, 28 of the second part 21-2 of the primary winding 21, a similar tap changer module 33 is provided. The second tap changer module is again associated with or comprises a switchable part of the transformer winding, in particular the $n_T$ turns between the outer taps 27 and 28 of the second tap changer module. The switchable winding part of the first tap changer module is electrically separated from the switchable winding part of the second tap changer module, i.e., there is no direct electrical connection between these switchable winding parts. An electrical connection can be established via one or both associated tap changer modules 33.

In particular, the connection points 38 of the two tap changer modules 33 are connected together. As can be seen, by opening and closing the switching valves 31, a connection can be established between the first tap 25 and the fourth tap 28, wherein the turns between these taps are taken out of the current path through the primary winding. On the other hand, if a connection is established between the second and third taps 26, 27, all turns of the primary winding form part of the current path through the primary winding 21. By switching the switching valves 31, different tap combinations and thus a different number of energized turns of the primary winding 21 can be achieved.

Providing the winding to which the tap changer 30 is coupled as a split winding has the advantage that the voltage to which the semiconductor switches are exposed can be limited. In the example of FIG. 5, the maximum voltage difference experienced by the switching valves 31 corresponds to the voltage drop across the switched winding part associated with the respective tap changer module. By providing a number of such tap changer modules, the voltage range of the tap changer can be extended, the voltage resolution can be extended, or both, while the voltage to which the semiconductor switches are exposed remains limited.

The transformer winding may be split into further parts, e.g., 2, 3, 4, 5 or even more parts. As an example, an additional tap changer module comprising an additional switchable winding part with $n_T$ additional turns can be provided, e.g., between taps 26 and 27. Such winding part may again be electrically separated from the first and second switchable winding parts, the switchable winding parts being connectable via the associated tap changer modules. Again, it should be noted that the tap changer modules can have two, three, for or more arms (and respective taps), depending on the application. Whereas the first and second tap changer modules of FIG. 5 have each two arms, the additional tap changer module may for example have three, four or five arms.

In other configurations, the primary winding may be provided as one part, and the taps may be provided at either end or at both ends of the primary winding. The configuration of FIG. 5 is particularly beneficial for a delta connection of the three primary windings of the three-phase transformer, since the connections between the windings for the different phases are unaffected by the tap changer 30.

A further possible configuration of the tap changer 30 is illustrated in FIG. 6. In the example of FIG. 6, the tap changer module 33 consists of three arms, wherein two arms comprise a changeover impedance 32 and the arm connected to the central tap does not comprise a changeover impedance. The changeover impedance can be connected directly to the respective tap (as shown in FIG. 5), or the switching valve 31 may be directly connected to the respective tap, as shown in FIG. 6. In FIG. 6, the switching valves 31 are numbered with symbols $S_1$-$S_N$. In any of the configurations described herein, the switching valve 31 can include two semiconductor switches connected antiparallel or antiseries (depending on the type of semiconductor switch). The connection is such that current can be controlled in either direction through the valve. Further semiconductor switches can be comprised in the switching valve, such as series connected antiparallel switches. These switches can be thyristors, and are optically controlled thyristors. Other semiconductor switches are also conceivable, such as IGBTs, GTOs, IGCTs, MOSFETs, or semiconductor switches employing WBG semiconductors.

In the embodiment of FIG. 6, the connection point 38 of the first module 33 is connected to a terminal of the transformer. The connection point 38 of subsequent modules is connected to the nearest tap of the adjacent module. Other configurations are conceivable, such as connecting the connection points 38 of two modules together.

It should be clear that in any of the tap changer configurations described herein, the tap changing can occur between neighboring taps or between distant taps. For example, in FIG. 6, the tap changer is capable of directly switching from the tap associated with switch 51 to the tap associated with switch S3, or even to the tap associated with switch $S_n$.

Based on the topology of the tap changer 30 of FIG. 6, FIGS. 8 to 10 illustrate a switching sequence for changing the transformer tap. The number $n_T$ again designates the number of turns between two taps. The configuration of FIGS. 8-10 allows the turn number of the primary winding to change by $4*n_T$. Each tap switches a tap voltage percentage of X %, wherein the tap $0*n_T$ corresponds to 0%, i.e., is the 0% tap. A respective increase in the number of turns by $n_T$ corresponds to a voltage increase by X %. In FIG. 8, the switching valve $S_2$ is closed thus providing a current path via the second tap. Furthermore, switching valve $S_4$ is closed, thus providing the current path via the fourth tap. Accordingly, $3*n_T$ turns are in the current path (besides the unswitched turns of the winding, i.e., a total of $3*n_T+N_P$ turns). To add $n_T$ additional turns, the first switching valve $S_1$ is closed, i.e., the respective semiconductor switches are controlled to switch to the 'on'-state, i.e., the non-blocking state. The turns of the primary winding between the first and second taps (i.e., between $S_1$ and $S_2$) are now short circuited, as illustrated in FIG. 9.

The changeover impedance 32 limits the short circuit current $I_{SC}$ (which can also be termed transient current) shown in FIG. 9. The current $I_P$ through the primary winding is not interrupted. The second switching valve $S_2$ is then opened, as shown in FIG. 10. The short circuit current $I_{SC}$ is therefore interrupted and the primary current $I_P$ flows via $S_1$ and the first tap. Accordingly, $4*n_T+N_P$ turns are now in the current path through the primary winding. The changeover thus occurs on-load and without interruption, and the short circuit current experienced during the changeover is efficiently limited by the changeover impedance 32. The other taps can be switched in a similar manner. The switching sequence is applicable to any of the tap changer configurations described herein. Such tap changing process reduces electric transients. In an embodiment, switching of the semiconductor switches occurs during a zero-crossing of the primary current $I_P$, in particular at a zero-crossing of the current through the switching valve that is being switched off, so that switching transients are minimized.

The changeover impedance 32 can include a resistance, an inductance, a semiconductor, or combination thereof. In an embodiment, it includes or consists of an inductance.

FIG. 7 illustrates a further configuration of the tap changer 30, in which the primary winding 21 is again provided as two separate parts 21-1 and 21-2. The tap changer module 33 has three arms, two of which include a changeover impedance 32. One module 33 is provided at the end of each winding part that is not connected to a transformer terminal. The connection points 38 of the modules 33 on the first part 21-1 and of the module 33 on the second part 21-2 are connected together. As mentioned above, each module may be provided with additional arms. Also, further modules 33 may be added by adding further split winding parts between the winding parts 21-1 and 21-2 and associating each split winding part with a module 33. With the number of taps, the resolution of the steps in which the transformation ratio can be adjusted can be increased. Furthermore, the range over which the transformation ratio can be adjusted can be extended. The number of taps of tap changer 30 can therefore be chosen in accordance with a desired adjustment range of the transformation ratio and the desired resolution.

It should be clear that respective tap changer modules 33 can be provide correspondingly on the winding of each phase, so that the transformation ratio of each phase can be adjusted individually. The wind turbine electrical system 10 can thus react to over/under-voltages or other disturbances occurring on only one of the phases by adjusting the transformation ratio for the respective phase.

In the electronic tap changer described herein, tap changing can occur at a high speed, in particular within 20 ms or even less, which corresponds to one grid electrical period.

Again, it is noted that the configurations of the tap changer 30 described above can be employed in any of the wind turbine transformers 20 disclosed herein.

FIG. 11 is a flow diagram showing a method according to an embodiment of the invention. As mentioned above, the grid code requires that power generating equipment remains connected to the power supply network for a certain amount of time when over/under-voltages of a certain size extend exist on the grid. These are generally defined by an envelope which indicates the voltage deviation to be tolerated for a specified time. If the voltage threshold or the time over which such voltage deviation exists is exceeded, the wind turbine is allowed to disconnect from the power grid. The method of FIG. 11 allows a fast reaction to such grid conditions and furthermore allows the wind turbine to remain connected to the power grid even if the disturbance of the grid voltage exceeds such envelope by far.

In step 201, the wind turbine is operated with a target voltage on the secondary side of the wind turbine transformer, i.e., on the LV/MV side. The voltage on the power grid 90 is monitored in step 202. It may for example be measured close to the terminal where the transformer 20 is connected to the power grid 90, as indicated in FIG. 1 or 2. Additionally or alternatively, the voltage on the secondary side of the transformer may be monitored, in particular measured, as the voltage on the secondary side is also indicative of voltage variations and disturbances on the primary side, i.e., of variations and disturbances of the power grid voltage. The subsequent steps can thus be equally performed with the measured secondary voltage (and accordingly with respective lower and upper limits/thresholds for the secondary side voltage).

In step 203, it is checked if the measured grid voltage exceeds an upper threshold. If not, it is checked in step 204 if the grid voltage has fallen below a lower threshold. If the grid voltage is within the upper and lower limits, the operation continues in step 201. If one of the thresholds is exceeded in steps 203 or 204, a transformation ratio is determined that is required to continue operation at the target voltage on the secondary side of the transformer for the detected grid voltage (steps 205 and 208 respectively). Based on the required transformation ratio, a transformer tap is then selected in steps 206 and 209, respectively. As only a limited number of taps are generally provided, the transformation ratio can only be changed with a certain resolution, so the tap that is as close as possible to the desired transformation ratio is selected.

In step 207, the semiconductor switches of the electronic on-load tap changer are then controlled to change the tap to the selected transformer tap. This can occur as described above with respect to FIGS. 8 to 10. Such process can be repeated to change through plural taps, or a change over several taps may be performed in one switching cycle. The turns ratio of the transformer is increased in step 207, i.e., additional turns are added into the current path through the primary winding so as to account for the higher grid voltage. Correspondingly, if the grid voltage has fallen below the threshold, the turns ratio of the transformer is decreased in step 210 by controlling the semiconductor switches of the electronic on-load tap changer 30 to change to the selected transformer tap. In particular, turns are removed from the current path through the primary winding to account for the lower grid voltage.

In step 211, the operation of the wind turbine is continued with the new transformation ratio, wherein the target voltage on the secondary side of the wind turbine transformer can be retained, the voltage can in particular be kept within operating limits. The whole process of detecting the over/undervoltage in steps 203, 204 and switching to the new transformer tap in steps 207 or 210 can occur within 100 ms, it can occur in as few as 60 ms. It is thus possible to react very quickly to voltage changes on the power grid 90, so that the wind turbine can remain connected to the power grid. Further, there is no time limit for continuing operation at such under/over voltages so that the operation can essentially continue indefinitely. By such method and wind turbine electrical system, the HVRT and LVRT requirements can therefore be exceeded by far. It should be clear that FIG. 11 shows only one control cycle, and that the method can continue in step 201 to continue operation with the target voltage on the secondary side.

It should be clear that the method illustrated in FIG. 11 can be implemented in the above-described control system. For example, steps 201 to 206 and 208 to 209 may be performed by converter controller 44 or by an independent controller of the tap changer, whereas steps 207 and 210 may be performed by the tap changer driver 23. The steps may be part of a feedforward control loop that monitors the grid voltage and adjusts the tap setting of the tap changer to keep the voltage on the secondary side of transformer 20 as constant as possible. It should be clear that such control method may also be implemented by monitoring the voltage on the secondary side of the transformer, i.e., on the LV/MV side, and by adjusting the turns ratio so that the monitored voltage on the secondary side stays within the predefined limits (i.e., within the voltage range defined by the respective lower and upper limits for the secondary side). The method may thus form part of a feedback loop. Both feedforward and feedback control may be implemented. The method can be performed independently for each phase of the transformer.

Further, steps 205-206 and 208-209 are optional. The tap may simply be changed to the next higher/lower tap until the voltage on the secondary side of the transformer is within predefined operating limits.

The limits for the secondary side may be determined as described above, for example in dependence on a nominal operating voltage for the secondary side of the transformer, that may be determined by the configuration of the converter. The lower limit (or threshold) for the secondary voltage may for example lie between 0.85 p.u. and 1.055 p.u. and the upper limit (or threshold) may lie between 1.065 p.u. and 1.14 p.u., referenced to the nominal operating voltage on the secondary side of the transformer. This is particularly beneficial in the DFIG configuration in which the converter is generally a voltage source converter.

FIG. 12 illustrates a method according to an embodiment of the invention. In step 301 the wind turbine is operated with a target voltage on the secondary side of the wind turbine transformer 20. In step 302, the active/reactive power generation operating point of the power generating system 40, in particular of the converter is changed, which may be due to a change in the prevailing wind conditions or in the reactive power demands by the power grid. A new target voltage for the secondary side of the transformer is derived from the changed operating point. In step 303, it is determined from the new target voltage for the secondary side if a tap change is required. For example, if the new target voltage is above or below a respective voltage threshold for the current tap setting, it is determined that a tap change is required to be able to operate at the new target voltage.

If it is determined in step 303 that the transformer is already operating at the transformer tap achieving the desired voltage on the secondary side (no tap change required in decision step 304), then operation of the wind turbine with the current tap setting is continued in step 305.

If a tap change is required in decision step 304, then the turns ratio of the transformer is changed in step 306 by controlling the semiconductor switches of the electronic on-load tap changer such that the change is made to the new transformer tap. For example, if a voltage limit on the secondary side is reached or exceeded (the voltage limits being defined in the above-described way with the current target voltage as a reference instead of the nominal operating voltage), the tap changer changes to the next tap and may repeat such tap changing until the desired voltage range for the secondary side is achieved. Alternatively, the tap setting that achieves the desired voltage on the secondary side may be determined based on information available to the controller (e.g., on the voltage changes achieved by the different tap settings) and the tap changer can be controlled to directly switch to the tap setting that achieves the desired voltage on the secondary side. In step 307, the operation of the wind turbine is continued with the respective tap setting and the desired target voltage on the secondary side of the wind turbine transformer. Accordingly, such method allows a flexible adjustment of the voltage on the secondary side. This allows the operator to relatively freely choose the operating point of the power generating system 40 of the wind turbine. The capability to provide reactive power can thus be maximized, and the wind turbine can be operated at an optimized efficiency. It should be clear that FIG. 12 shows only one control cycle, and that the method can continue in step 301 to perform a further adjustment of the secondary side voltage.

The method of FIG. 12 performs a tap change if the new target voltage lies outside the voltage range (i.e., exceeds the voltage limits) specified with respect to the current target voltage. However, a tap change may likewise be performed if the secondary voltage lies outside the voltage range (i.e., outside the voltage limits) determined with respect to the new target voltage. This corresponds to the situation as described with respect of FIG. 11 in which a tap change is performed if the secondary voltage exceeds the lower and upper voltage limits specified for the secondary side (here with respect to the new target voltage instead the fixed nominal operating voltage).

The steps of the method of FIG. 12 may again be implemented by the control system 50. In particular, steps 301 to 304 may be performed by the converter controller 44 of a separate controller of the tap changer, whereas step 306 may be performed by the tap changer driver 23. The method may be performed as part of a process of adjusting the operating point of the converter 41. It should further be clear that both of the methods of FIG. 11 and FIG. 12 may be performed together by the control system 50, i.e., embodiments of the method can comprise both methods, and both methods can be implemented simultaneously in the control system 50. It should further be clear that during operation, the tap changer may reach the last tap on either end, and may thus not be able to further adjust the turns ratio (this situation is not illustrated in FIGS. 11 and 12). The control system can detect such situation and may implement different measures, such as disconnecting the electrical power generating system from the grid after a predetermined amount of time.

The tap changer disclosed herein may also be provided separate from a wind turbine electrical system and in particular separate from a wind turbine transformer.

The methods and systems described here have several advantages. Besides facilitating the achieving of grid code compliance, even for strict HVRT and LVRT requirements, the electrical capabilities of the wind turbine can be maximized, such as reactive power generating capabilities, operation points, rotational speed deviations and the like. As the voltage on the secondary side of the transformer can be kept relatively constant, failure rates of the components of the electrical system can be reduced, as these are not exposed to over-voltages. Also, the mechanical stress applied to wind turbine components due to disturbances of grid voltage can be reduced significantly. Furthermore, cost reductions can be achieved, since the costs of the LV and/or MV components can be reduced, as they do not need to be over-rated, and as no additional expensive equipment, such as FACTs, has to be installed (or it can be reduced in size) to meet the grid code requirements. Operation on unbalanced and weak grids is also made possible.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method of controlling a wind turbine transformer, comprising:
providing the wind turbine transformer, the wind turbine transformer having a primary side with a primary winding coupled to a power grid and a secondary side with a secondary winding coupled to an electrical power generating system of the wind turbine, wherein the wind turbine transformer further comprises an electronic on-load tap changer having semiconductor switches that are controllable to change a turns ratio of the primary winding to the secondary winding of the wind turbine transformer, wherein the electronic on-load tap changer includes at least one, or at least two tap changer modules, wherein each tap changer module comprises a first arm connected at one end to a first tap of the respective transformer winding and a second arm connected at one end to a second tap of the respective transformer winding, wherein the other ends of the first and second arms are connected together at a connection point, and wherein the tap changer module further includes a third arm connected at one end to a third tap of the respective transformer winding and at its other end to the connection point, wherein in at least two of the three arms, a changeover impedance is connected in series with the respective semiconductor switch, wherein a control system is coupled to the electronic on-load tap changer to control the turns ratio, wherein the control system comprises a converter controller of a converter of the electrical power generating system, wherein the converter controller controls the electronic on-load tap changer,
monitoring a voltage on the primary side of the wind turbine transformer, a voltage on the secondary side of the wind turbine transformer, or both;
detecting a change in the monitored voltage; and
automatically controlling the semiconductor switches of the electronic on-load tap changer to adjust the turns ratio of the wind turbine transformer to directly compensate for the change in the monitored voltage, wherein directly compensating for the change in the monitored voltage includes adjusting the turns ratio of the transformer so as to keep the voltage on the secondary side of the transformer within a predetermined voltage range, and wherein directly compensating for the change in the monitored voltage is independent of a current reference and/or is independent of current monitoring.

2. The method of claim 1, wherein at least the voltage on the primary side of the wind turbine transformer is monitored, wherein upon detecting a voltage increase in the monitored voltage, the semiconductor switches of the electronic on-load tap changer are controlled to increase the turns ratio so as to maintain the voltage on the secondary side below a predefined upper voltage limit, and/or wherein upon detecting a voltage drop in the monitored voltage, the semiconductor switches of the electronic on-load tap changer are controlled to decrease the turns ratio so as to maintain the voltage on the secondary side above a predefined lower voltage limit.

3. The method of claim 1, wherein at least the voltage on the secondary side of the wind turbine transformer is monitored, wherein monitoring the voltage on the secondary side of the wind turbine transformer comprises measuring the voltage on the secondary side of the wind turbine transformer, wherein upon determining a voltage change in the monitored voltage on the secondary side, the semiconductor switches of the electronic on-load tap changer are controlled to adjust the turns ratio so as to compensate the change.

4. The method according to claim 1, wherein controlling the semiconductor switches of the electronic on-load tap changer to adjust the turns ratio of the wind turbine transformer comprises determining a new tap setting required to obtain the adjusted turns ratio, and switching the semiconductor switches within 500 ms upon detecting the change in the monitored voltage, or within 300 ms, 200 ms or 100 ms upon detecting the change in the monitored voltage, to change the tap of the electronic on-load tap changer to the new tap setting.

5. The method according to claim 1, wherein adjusting the turns ratio of the wind turbine transformer by controlling the semiconductor switches comprises changing a current path through the primary winding and/or through the secondary winding from the first tap to the second tap, wherein changing the current path comprises closing a second semiconductor switch coupled to the second tap to provide a connection from the first tap to the second tap via the second semiconductor switch and via a changeover impedance.

6. The method according to claim 5, wherein adjusting the turns ratio further comprises opening a first semiconductor switch coupled to the first tap to interrupt the connection from the first tap to the second tap via the changeover impedance, the second semiconductor switch remaining closed and forming part of the current path.

7. The method according to claim 1, wherein controlling the semiconductor switches to adjust the turns ratio of the transformer comprises switching the semiconductor switches at a zero-crossing of a current through the respective semiconductor switch that is to be switched.

8. The method according to claim 1, wherein detecting the change in the monitored voltage and automatically controlling the semiconductor switches of the electronic on-load tap changer to adjust the turns ratio of the wind turbine transformer to compensate for the change comprises:
   detecting if the voltage on the secondary side of the transformer reaches or exceeds a predefined upper or lower voltage limit; and
   if the predefined upper or lower voltage limit is reached or exceeded, adjusting the turns ratio of the wind turbine transformer so as to keep the voltage on the secondary side of the transformer within a voltage range determined by the upper and lower voltage limits.

9. A wind turbine electrical system comprising:
   a transformer comprising a primary side with a primary winding configured to be coupled to a power grid and a secondary side with a secondary winding configured to be coupled to an electrical power generating system of the wind turbine, wherein the wind turbine transformer further comprises an electronic on-load tap changer, wherein the electronic on-load tap changer comprises semiconductor switches that are connected and configured such that by controlling the semiconductor switches, a turns ratio of the primary winding to the secondary winding of the wind turbine transformer is adjustable to compensate for voltage changes on the primary side and/or the secondary side of the wind turbine transformer; and
   a control system coupled to the electronic on-load tap changer to control the turns ratio, wherein the control system comprises a converter controller of a converter of the wind turbine electrical system, wherein the converter controller is configured to control the electronic on-load tap changer, wherein the control system is configured to perform:
   monitoring a voltage on the primary side of the wind turbine transformer, a voltage on the secondary side of the wind turbine transformer, or both; and
   in direct response to a change in the monitored voltage, automatically controlling the semiconductor switches of the electronic on-load tap changer to adjust the turns ratio of the wind turbine transformer to compensate for the change in the monitored voltage, wherein compensating for the change in the monitored voltage includes adjusting the turns ratio of the transformer so as to keep the voltage on the secondary side of the transformer within a predetermined voltage range, wherein compensating for the change in the monitored voltage is independent of a current reference and/or is independent of current monitoring;
   wherein the electronic tap changer comprises at least one, or at least two tap changer modules,
   wherein each tap changer module comprises a first arm connected at one end to a first tap of the primary winding and/or the secondary winding and a second arm connected at one end to a second tap of the primary winding and/or the secondary winding, wherein the other ends of the first and second arms are connected together at a connection point, wherein each arm comprises at least one semiconductor switch to switch on and off a current path via the respective tap, and wherein at least one of the arms comprises a changeover impedance connected in series with the semiconductor switch; and
   wherein the tap changer module further includes a third arm connected at one end to a third tap of the primary winding and/or the secondary winding and at its other end to the connection point, the third arm comprising a semiconductor switch to switch on and off a current path via the third tap,
   wherein in at least two of the three arms, a changeover impedance is connected in series with the respective semiconductor switch.

10. The wind turbine electrical system of claim 9, wherein the electronic on-load tap changer comprises plural taps connected to the primary winding and/or the secondary winding, wherein the plural taps comprise one or more taps to which a changeover impedance is coupled and another one or more taps to which no changeover impedance is coupled, wherein a tap to which no changeover impedance is coupled is neighbored by at least one tap to which a changeover impedance is coupled.

11. The wind turbine electrical system of claim 10, wherein the plural taps include a first tap and a second tap connected to the primary winding and/or the secondary winding,
   wherein the tap changer further comprises a first switching valve including the semiconductor switch coupled to the first tap, a second switching valve including the semiconductor switch coupled to the second tap, and the changeover impedance connected in series with the first switching valve or with the second switching valve, wherein the first and second switching valves are coupled together such that by closing the first and second switching valves, an electrical connection is established from the first tap to the second tap via the first switching valve, the changeover impedance and the second switching valve.

12. The wind turbine electrical system of claim 9, wherein the connection point is connected to a terminal of the wind turbine transformer, is connected to a further tap of the primary winding and/or the secondary winding, or is connected to the connection point of a further tap changer module.

13. The wind turbine electrical system of claim 9, wherein each tap changer module is associated with or comprises a switchable part of the respective winding to which the tap changer is coupled, wherein the respective winding is split into two or more parts such that the switchable part of the respective winding associated with one tap changer module is electrically separated from the switchable part of the respective winding of the one or more other tap changer modules, the switchable parts of the respective winding being connectable via the associated tap changer modules.

14. The wind turbine electrical system of claim 9, wherein the semiconductor switches are light controlled semiconductor switches, in particular light triggered thyristors or light activated electrically triggered semiconductor switches.

15. The wind turbine electrical system of claim 9, wherein the control system is further configured to perform a method of controlling a wind turbine transformer.

16. The wind turbine electrical system according to claim 9, further comprising the converter, wherein the converter controller is configured to define an operating point for the converter and to derive therefrom a target operating voltage to be provided to the secondary side of the wind turbine transformer, wherein the converter controller is further configured to adjust the turns ratio of the wind turbine transformer based on the target operating voltage.

17. A wind turbine electrical system comprising:
a transformer comprising a primary side with a primary winding configured to be coupled to a power grid and a secondary side with a secondary winding configured to be coupled to an electrical power generating system of the wind turbine, wherein the transformer further comprises an electronic on-load tap changer, wherein the electronic on-load tap changer comprises semiconductor switches that are connected and configured such that by controlling the semiconductor switches, a turns ratio of the primary winding to the secondary winding of the wind turbine transformer is adjustable to compensate for voltage changes on the primary side and/or the secondary side of the wind turbine transformer; and
a control system coupled to the electronic on-load tap changer to control the turns ratio, wherein the control system comprises a converter controller of a converter of the wind turbine electrical system, wherein the converter controller is configured to control the electronic on-load tap changer, wherein the control system is configured to perform:

monitoring a voltage on the primary side of the wind turbine transformer, a voltage on the secondary side of the wind turbine transformer, or both; and
in response to detecting a change in the monitored voltage, automatically controlling the semiconductor switches of the electronic on-load tap changer to adjust the turns ratio of the wind turbine transformer to compensate for the change;
wherein the electronic tap changer comprises at least one, or at least two tap changer modules,
wherein each tap changer module comprises a first arm connected at one end to a first tap of the respective transformer winding and a second arm connected at one end to a second tap of the respective transformer winding, wherein the other ends of the first and second arms are connected together at a connection point, and wherein the tap changer module further includes a third arm connected at one end to a third tap of the respective transformer winding and at its other end to the connection point, wherein in at least two of the three arms, a changeover impedance is connected in series with the respective semiconductor switch.

* * * * *